(12) United States Patent
Lee et al.

(10) Patent No.: US 11,171,761 B2
(45) Date of Patent: *Nov. 9, 2021

(54) METHOD FOR TRANSMITTING AND RECEIVING DATA IN WIRELESS COMMUNICATION SYSTEM AND APPARATUS FOR THE SAME

(71) Applicant: LG ELECTRONICS INC., Seoul (KR)

(72) Inventors: Eunjong Lee, Seoul (KR); Jaehoon Chung, Seoul (KR); Genebeck Hahn, Seoul (KR); Jinmin Kim, Seoul (KR); Kukheon Choi, Seoul (KR); Kwangseok Noh, Seoul (KR); Sangrim Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 27 days.

This patent is subject to a terminal disclaimer.

(21) Appl. No.: 16/542,849

(22) Filed: Aug. 16, 2019

(65) Prior Publication Data

US 2019/0372742 A1 Dec. 5, 2019

Related U.S. Application Data

(63) Continuation of application No. 15/520,737, filed as application No. PCT/KR2015/003457 on Apr. 7, 2015, now Pat. No. 10,411,869.

(Continued)

(51) Int. Cl.
*H04L 5/00* (2006.01)
*H04W 72/12* (2009.01)
(Continued)

(52) U.S. Cl.
CPC .............. *H04L 5/0087* (2013.01); *H04L 1/00* (2013.01); *H04L 5/001* (2013.01); *H04L 5/0092* (2013.01);
(Continued)

(58) Field of Classification Search
None
See application file for complete search history.

(56) References Cited

U.S. PATENT DOCUMENTS

2009/0296833 A1 12/2009 Sawahashi
2010/0172428 A1 7/2010 Pani et al.
(Continued)

FOREIGN PATENT DOCUMENTS

JP 2014-514787 A 6/2014
JP 2016-72843 A 5/2016
(Continued)

OTHER PUBLICATIONS

Ji, U.S. Appl. No. 62/000,443, filed May 19, 2014 (Year: 2014).*
(Continued)

*Primary Examiner* — Jay L Vogel
(74) *Attorney, Agent, or Firm* — Birch, Stewart, Kolasch & Birch, LLP

(57) ABSTRACT

A method and device for receiving downlink data in a wireless communication system are discussed. The method performed by a terminal includes receiving, from a base station, first downlink control information through a physical downlink control channel (PDCCH) or a short PDCCH (sPDCCH), wherein the first downlink control information schedules a plurality of short physical downlink shared channel (sPDSCH) regions based on a first transmission time interval (TTI)-based radio frame structure, and each of the plurality of the sPDSCH regions is included in a different plurality of short subframes based on the first TTI-based
(Continued)

radio frame structure, respectively; and receiving, from the base station, first downlink data in the plurality of the sPDSCH regions based on the first downlink control information, wherein the first TTI-based radio frame structure has a shorter interval than a second TTI-based radio frame structure for the PDSCH region in which second downlink data is transmitted.

15 Claims, 25 Drawing Sheets

Related U.S. Application Data

(60) Provisional application No. 62/066,860, filed on Oct. 21, 2014, provisional application No. 62/073,033, filed on Oct. 31, 2014, provisional application No. 62/074,097, filed on Nov. 3, 2014.

(51) Int. Cl.
*H04W 72/04* (2009.01)
*H04L 5/14* (2006.01)
*H04L 1/00* (2006.01)
*H04W 52/34* (2009.01)

(52) U.S. Cl.
CPC ............ *H04L 5/14* (2013.01); *H04W 72/042* (2013.01); *H04W 72/1273* (2013.01); *H04W 72/1289* (2013.01); *H04L 5/0023* (2013.01); *H04L 5/0044* (2013.01); *H04L 5/0053* (2013.01); *H04W 52/34* (2013.01); *H04W 72/0446* (2013.01)

(56) References Cited

U.S. PATENT DOCUMENTS

| | | | |
|---|---|---|---|
| 2012/0213170 A1 | 8/2012 | Choi et al. | |
| 2012/0230258 A1 | 9/2012 | Miki | |
| 2013/0039188 A1* | 2/2013 | Larsson | H04L 1/0039 370/241 |
| 2014/0071954 A1* | 3/2014 | Au | H04W 28/0205 370/336 |
| 2014/0098799 A1 | 4/2014 | Kang et al. | |
| 2014/0226607 A1 | 8/2014 | Holma et al. | |
| 2015/0180619 A1 | 6/2015 | Majjigi et al. | |
| 2015/0188650 A1* | 7/2015 | Au | H04L 5/0094 370/312 |
| 2015/0334685 A1* | 11/2015 | Ji | H04W 72/1247 370/330 |
| 2015/0334702 A1 | 11/2015 | Ji et al. | |
| 2016/0088604 A1* | 3/2016 | Patel | H04L 5/0064 370/336 |
| 2016/0095094 A1 | 3/2016 | Xu et al. | |
| 2016/0095105 A1* | 3/2016 | Chen | H04L 5/0053 370/329 |
| 2016/0100395 A1* | 4/2016 | Xu | H04W 72/0446 370/336 |
| 2016/0113008 A1 | 4/2016 | Damnjanovic et al. | |
| 2018/0041325 A1 | 2/2018 | Lee et al. | |
| 2018/0219666 A1 | 8/2018 | Lee et al. | |

FOREIGN PATENT DOCUMENTS

| | | |
|---|---|---|
| JP | 2017-513202 A | 5/2017 |
| JP | 2017-533620 A | 11/2017 |
| WO | WO 2013/110683 A1 | 8/2013 |
| WO | WO 2013/113158 A1 | 8/2013 |
| WO | WO 2016/040290 A1 | 3/2016 |
| WO | WO 2016/048781 A1 | 3/2016 |
| WO | WO 2016/053844 A1 | 4/2016 |
| WO | WO 2017/173038 A1 | 10/2017 |

OTHER PUBLICATIONS

Patel U.S. Appl. No. 62/053,740, filed Sep. 22, 2014 (Year: 2014).*
Chen, U.S. Appl. No. 62/056,397, filed Sep. 26, 2014 (Year: 2014).*
Catania et al., "The Potential of Flexible UL/DL Slot Assignment in 5G Systems," 2014 IEEE 80th Vehicular Technology Conference (VTC Fall), Sep. 17, 2014, 7 pages.
Ericsson, "Revised Work Item on shortened TTI and processing time for LTE," 3GPP TSG RAN Meeting #74, RP-162014, Vienna, Austria, Dec. 5-8, 2016, 9 pages.
Ericsson, "Study on Latency Reduction Techniques for LTE", RP-141375, 3GPP TSG RAN Meeting #65, Edinburgh, Scotland, Sep. 2, 2014, See pp. 1-8.
Mogensen et al., "5G small cell optimized radio design," 2013 IEEE Globecom Workshops, Dec. 13, 2013, 7 pages.
U.S. Appl. No. 62/053,740, filed Sep. 22, 2014 (Year: 2014).
U.S. Appl. No. 62/064,934, filed Oct. 16, 2014 (Year: 2014).
Shin et al., "Uplink Frame structure of Short TTI system," Electronics and Telecommunications Research Institute, Daejeon, Korea, Feb. 19-22, 2017, 4 pages.
Wang et al., "Perspectives on New Waveform Design for 5G Small Cell," 2014 URSI General Assembly and Scientific Symposium (URSI GASS), Aug. 23, 2014, 5 pages.
Xiaotong et al., "Study on System Latency Reduction Based on Shorten TTI," 2016 IEEE 13th International Conference on Signal Processing (ICSP), Chengdu, China, 5 pages.

* cited by examiner

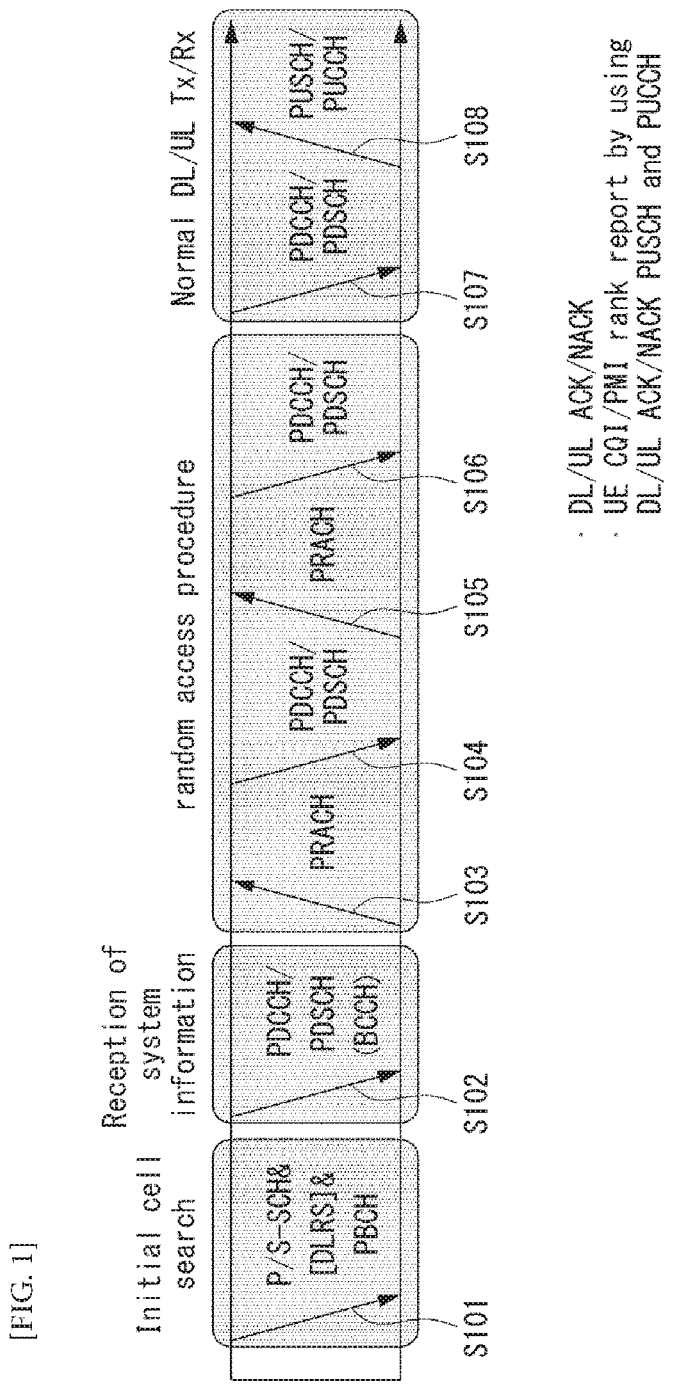
[FIG. 1]

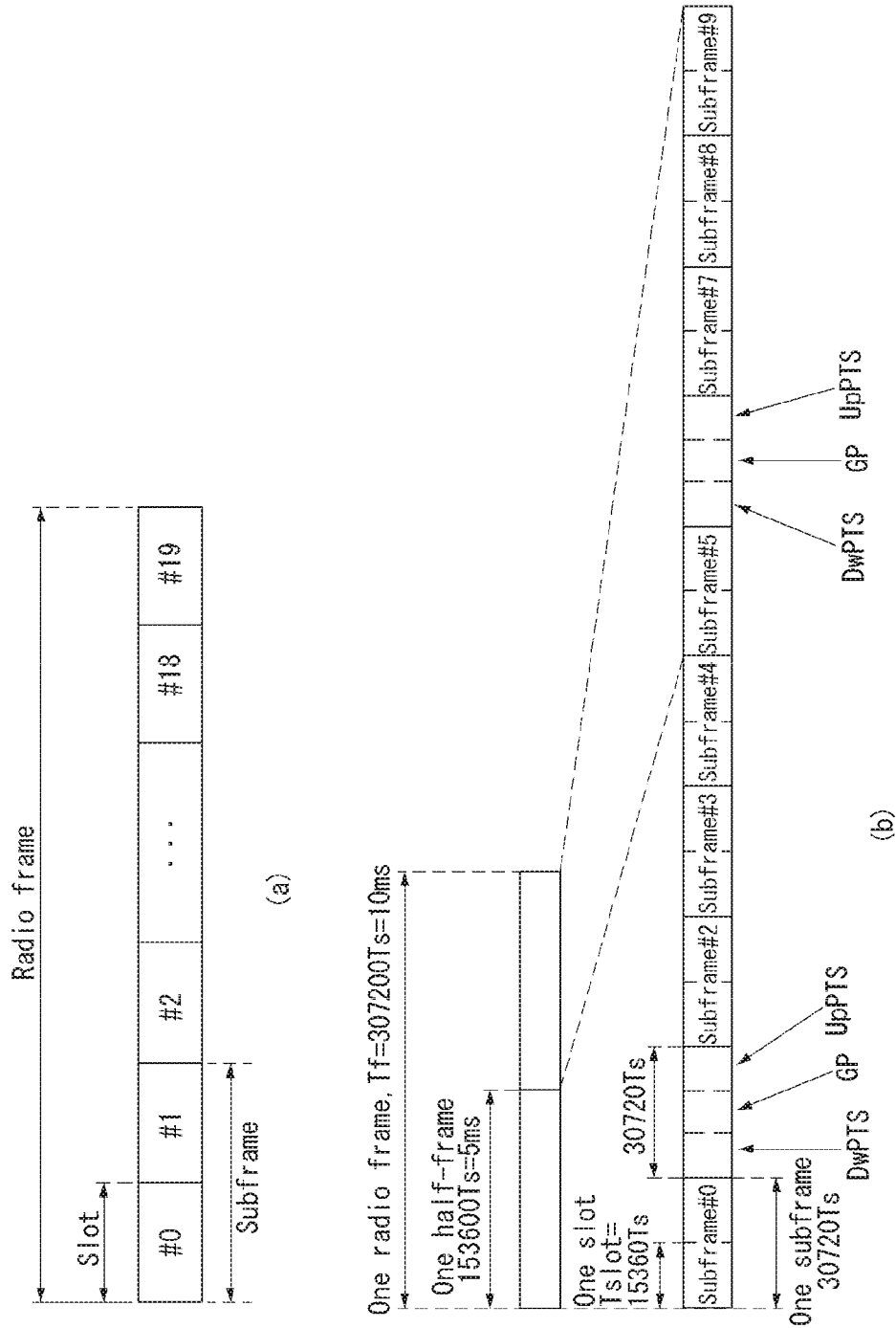
[FIG. 2]

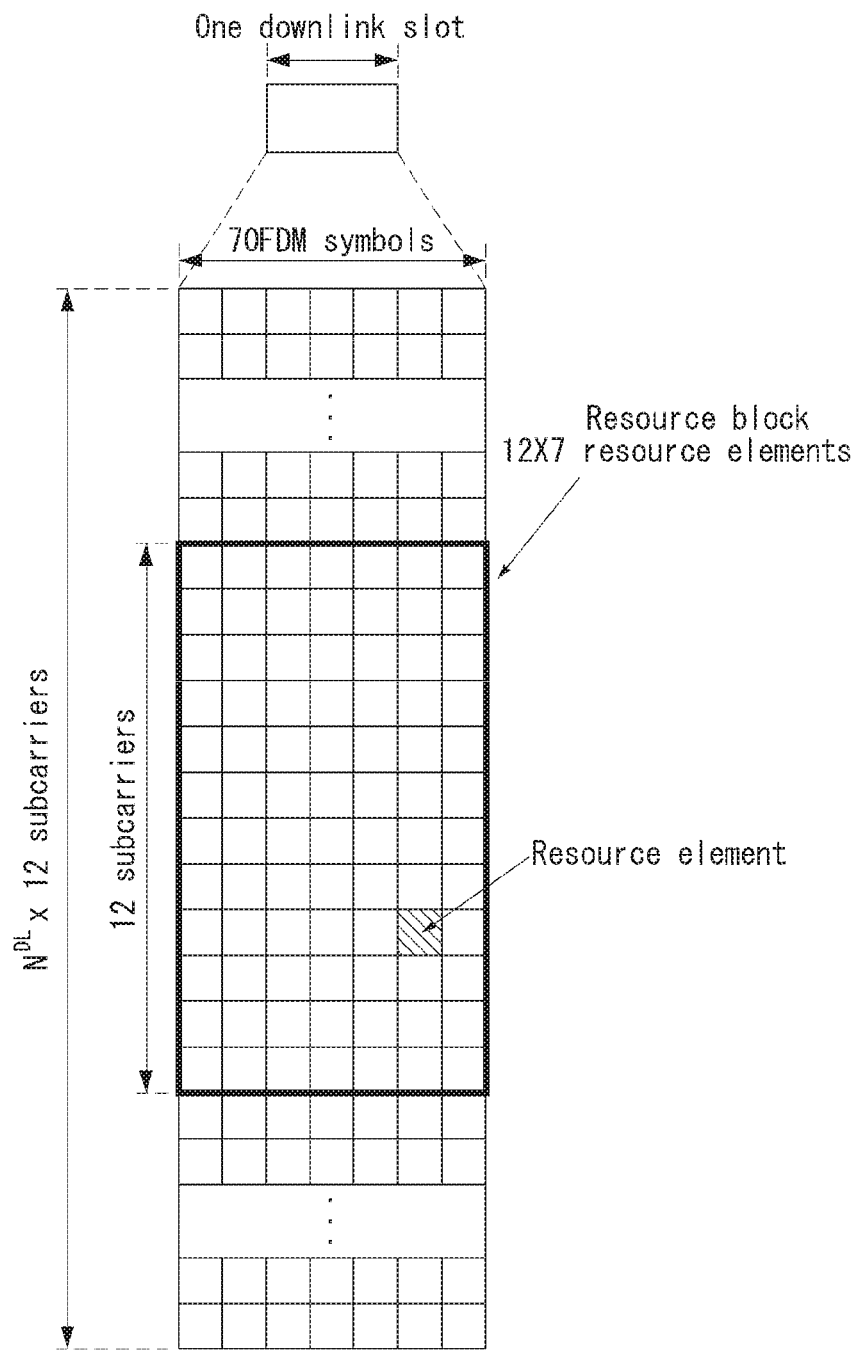
[FIG. 3]

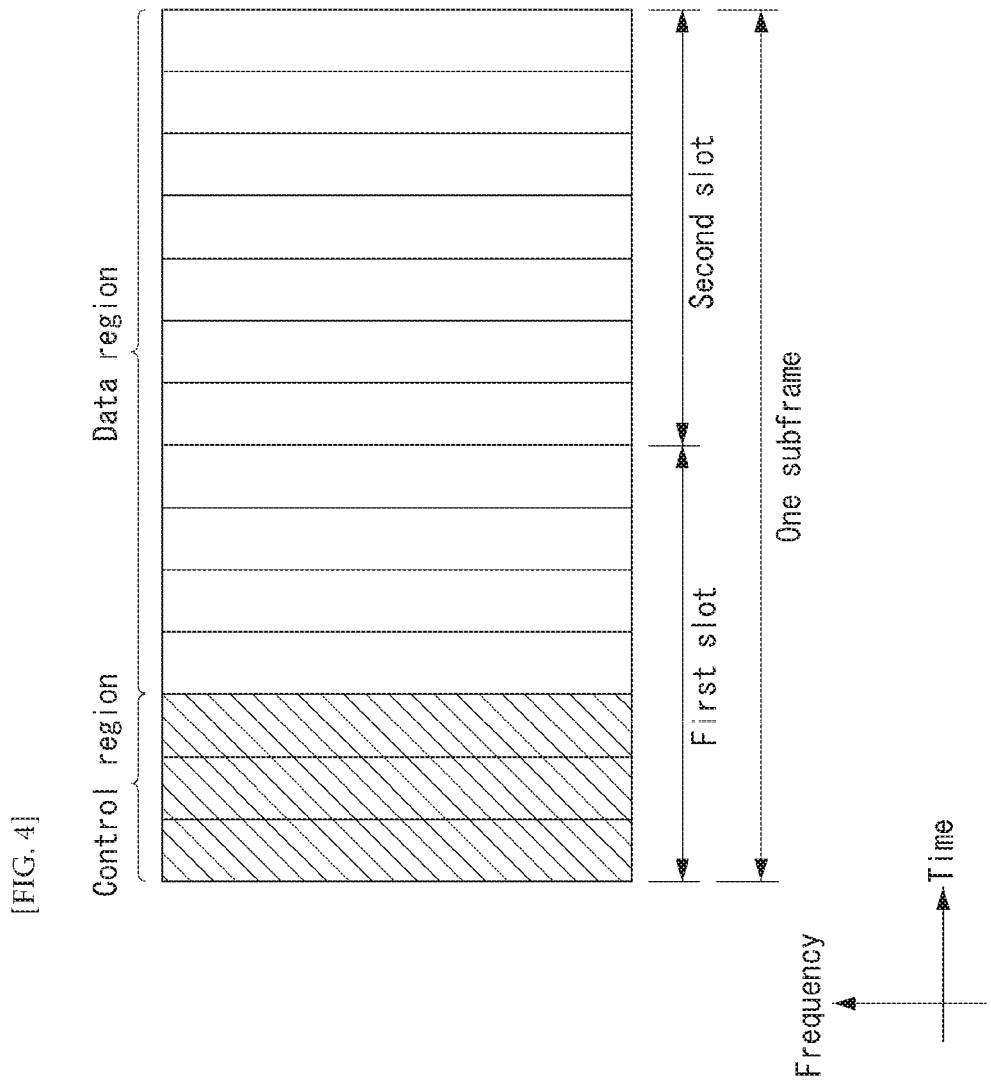
[FIG. 4]

[FIG. 5]
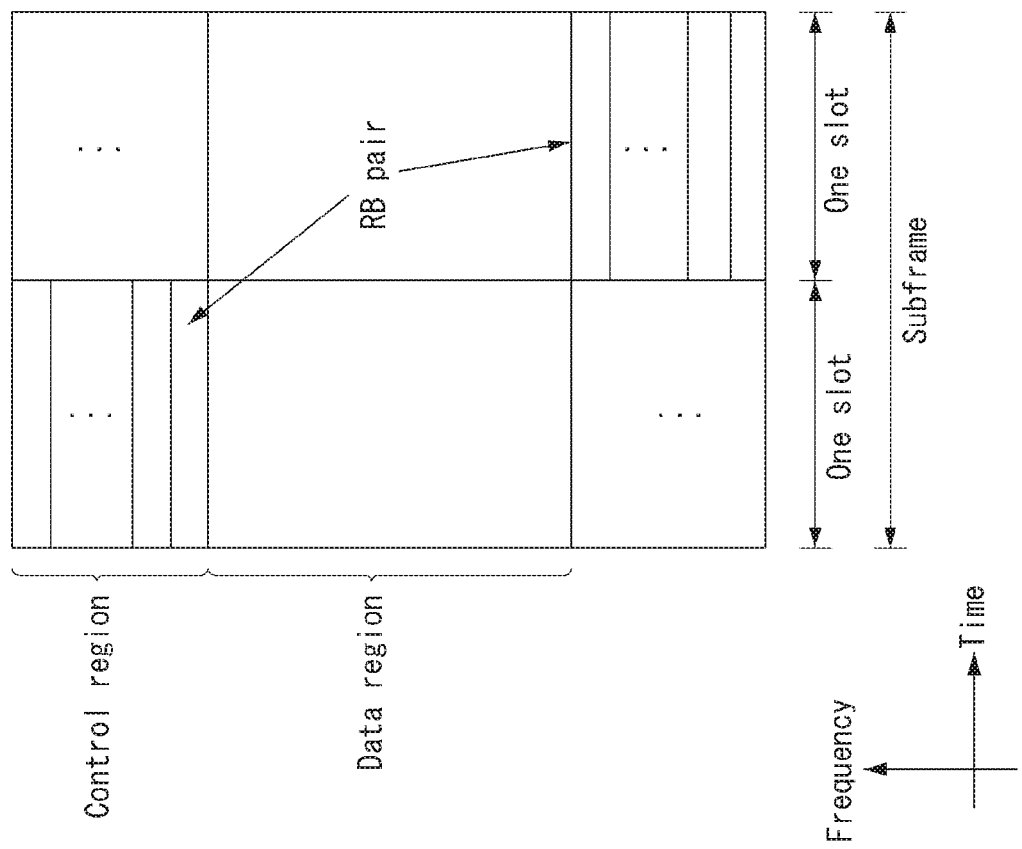

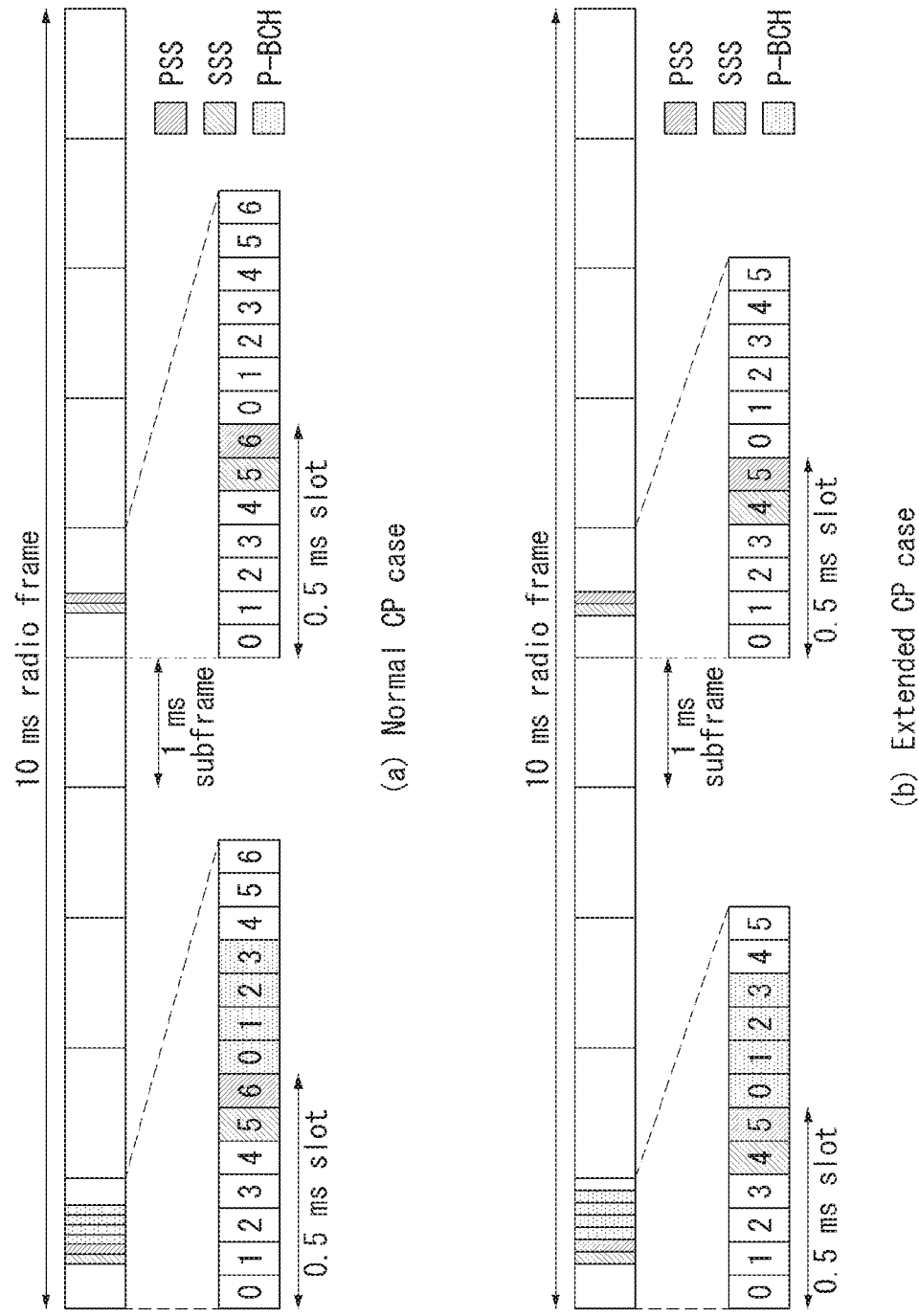
[FIG. 6]

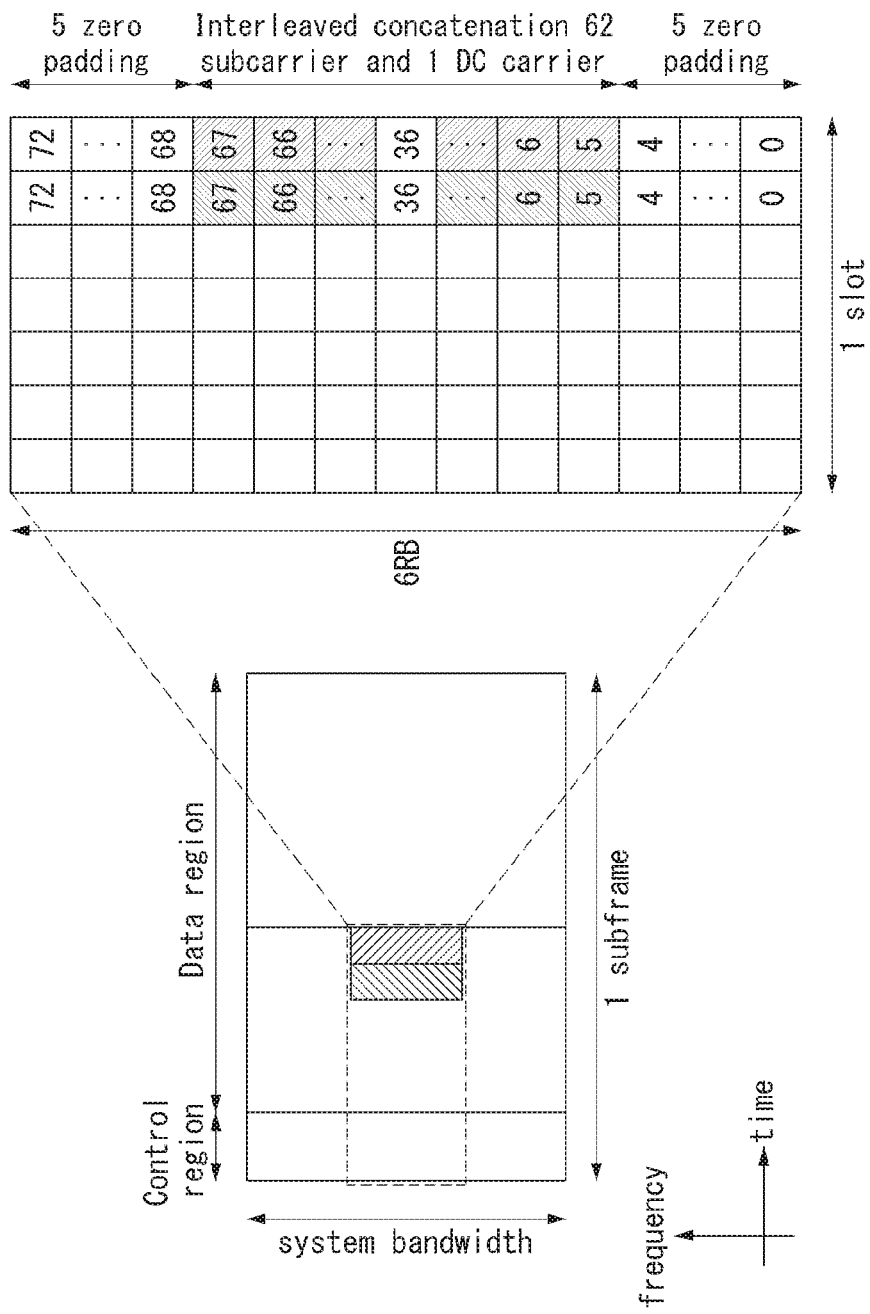

[FIG. 8]
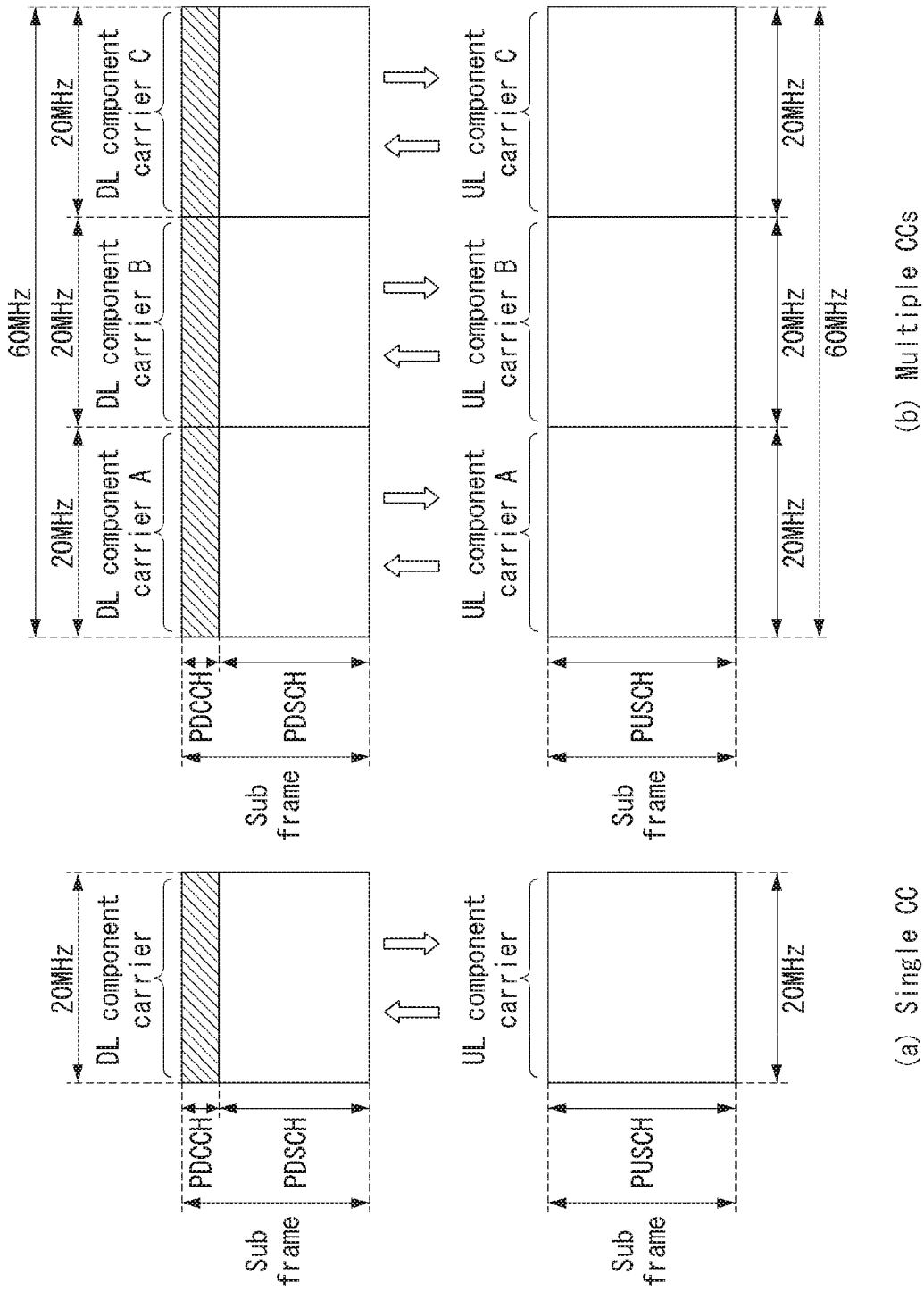

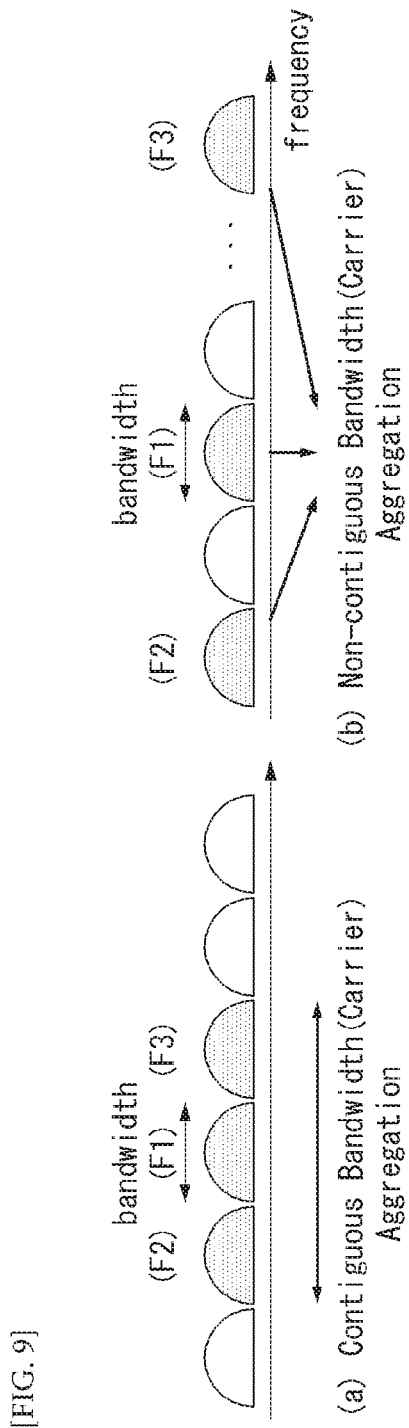
[FIG. 9]

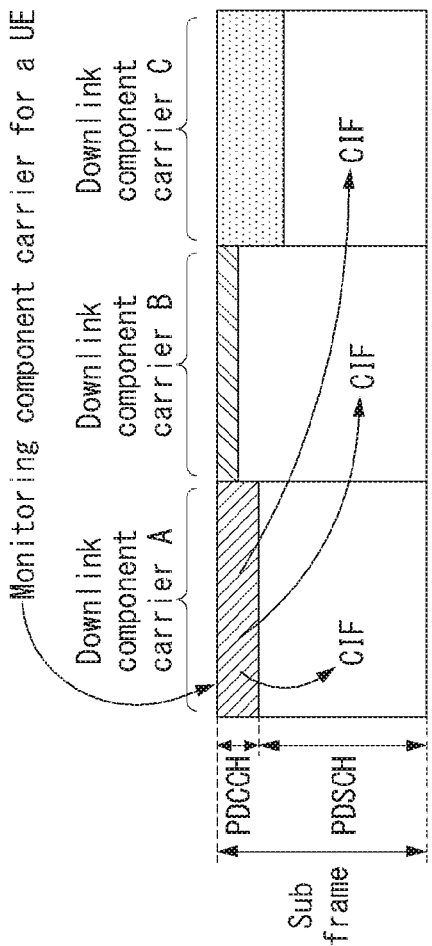
[FIG. 10]

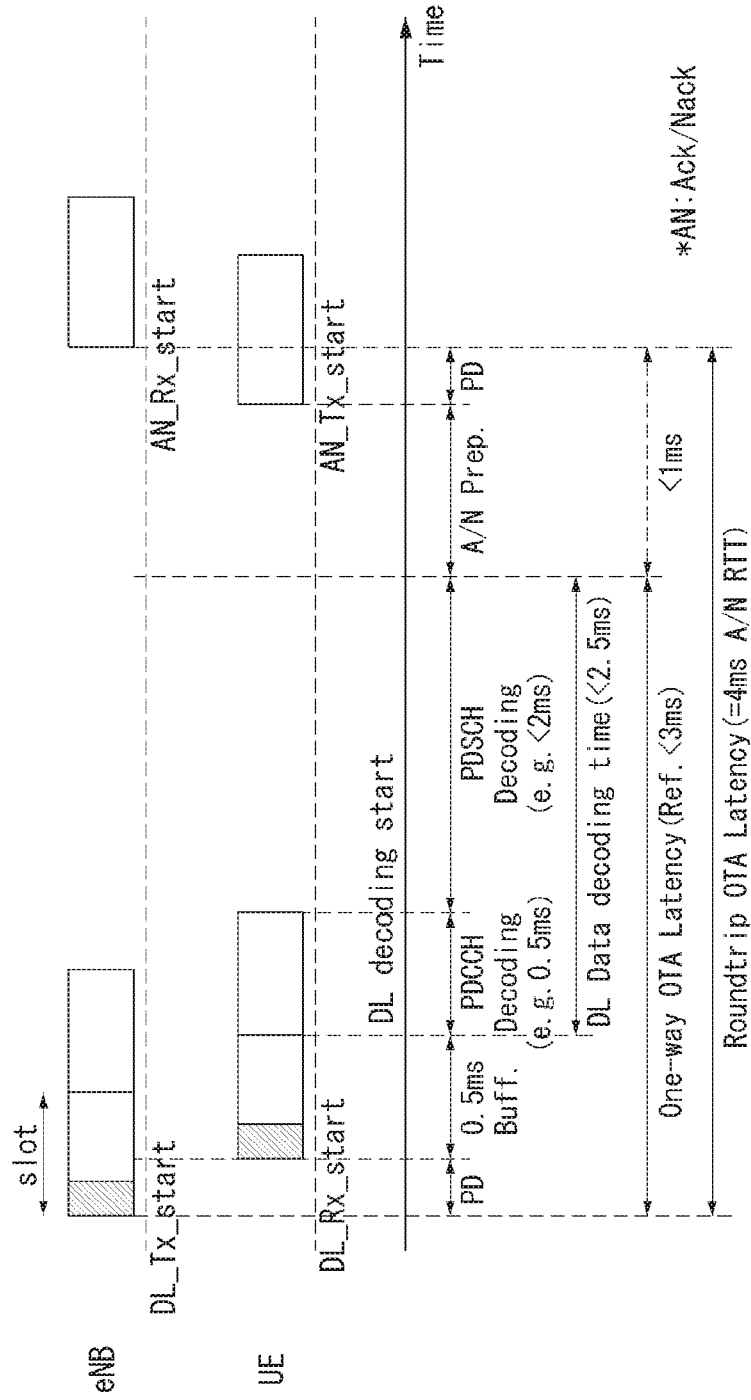
[FIG. 11]

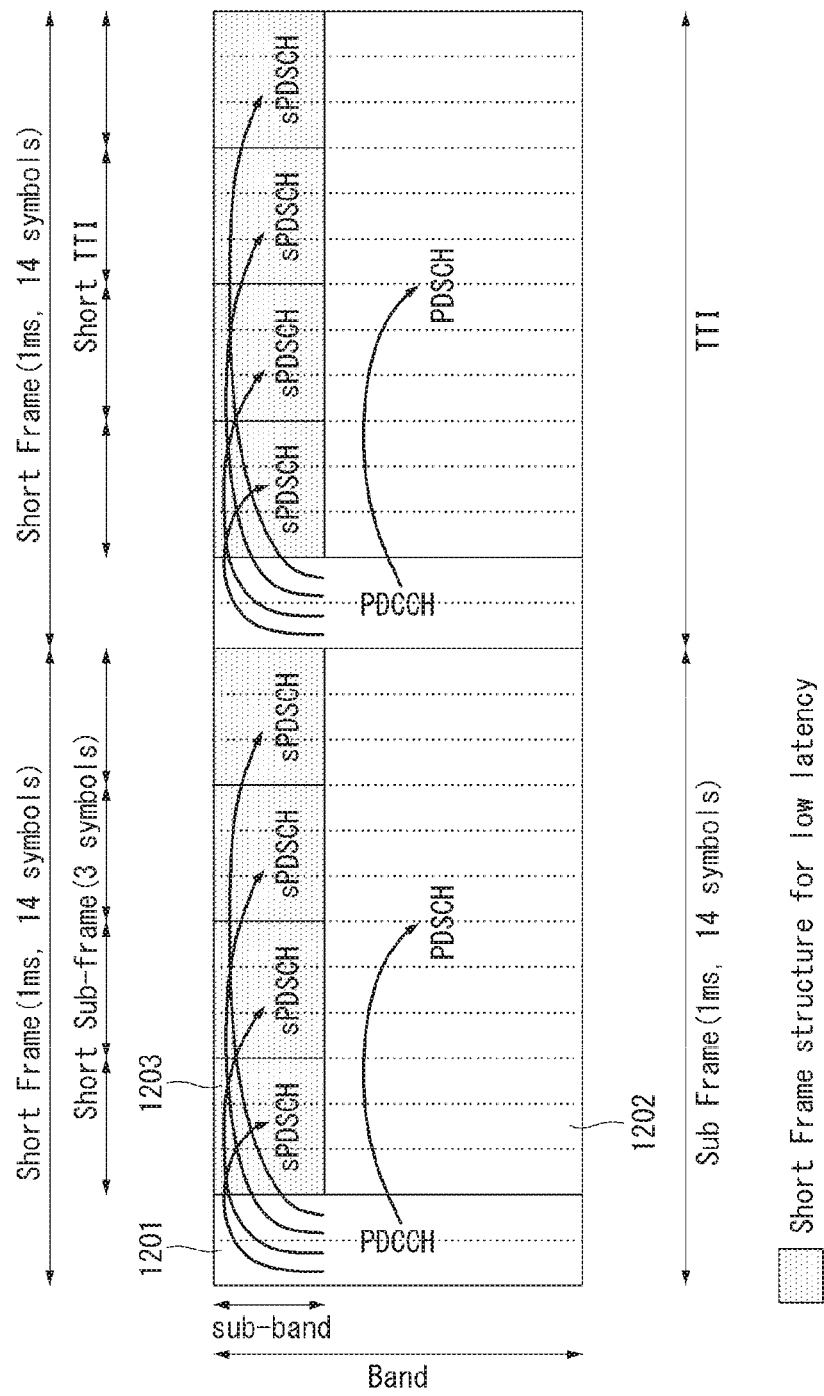
[FIG. 12]

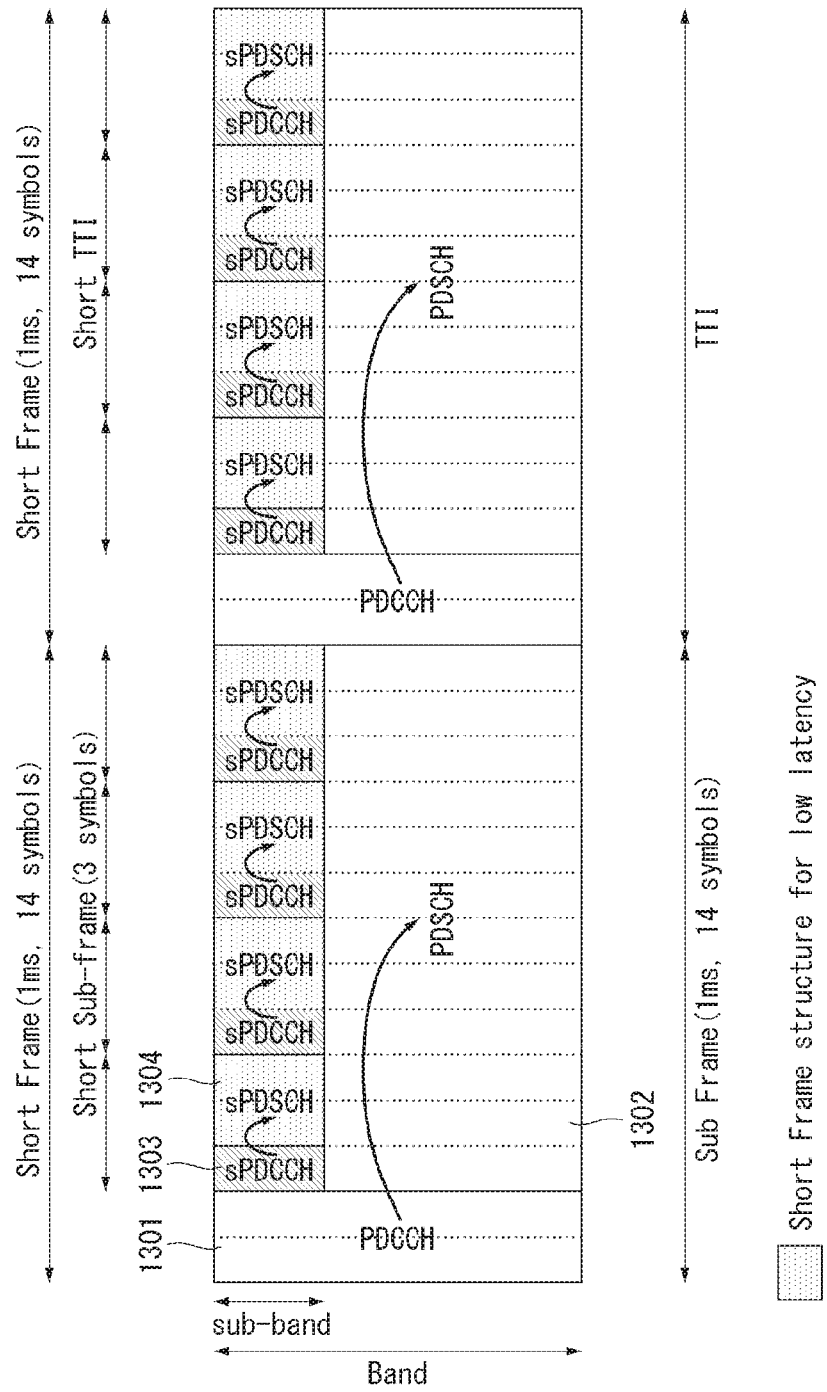
[FIG. 13]

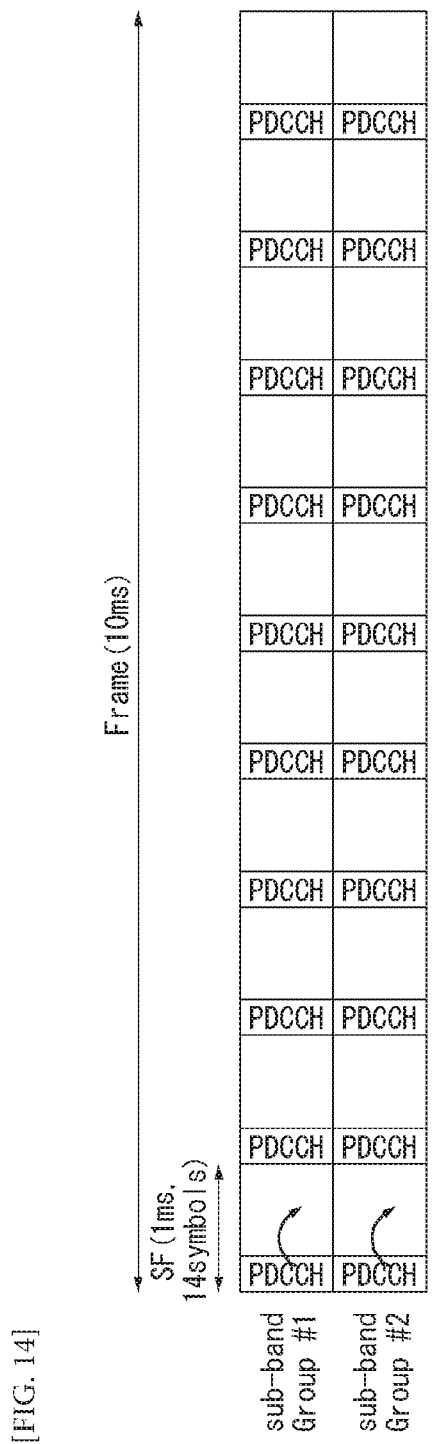
[FIG. 14]

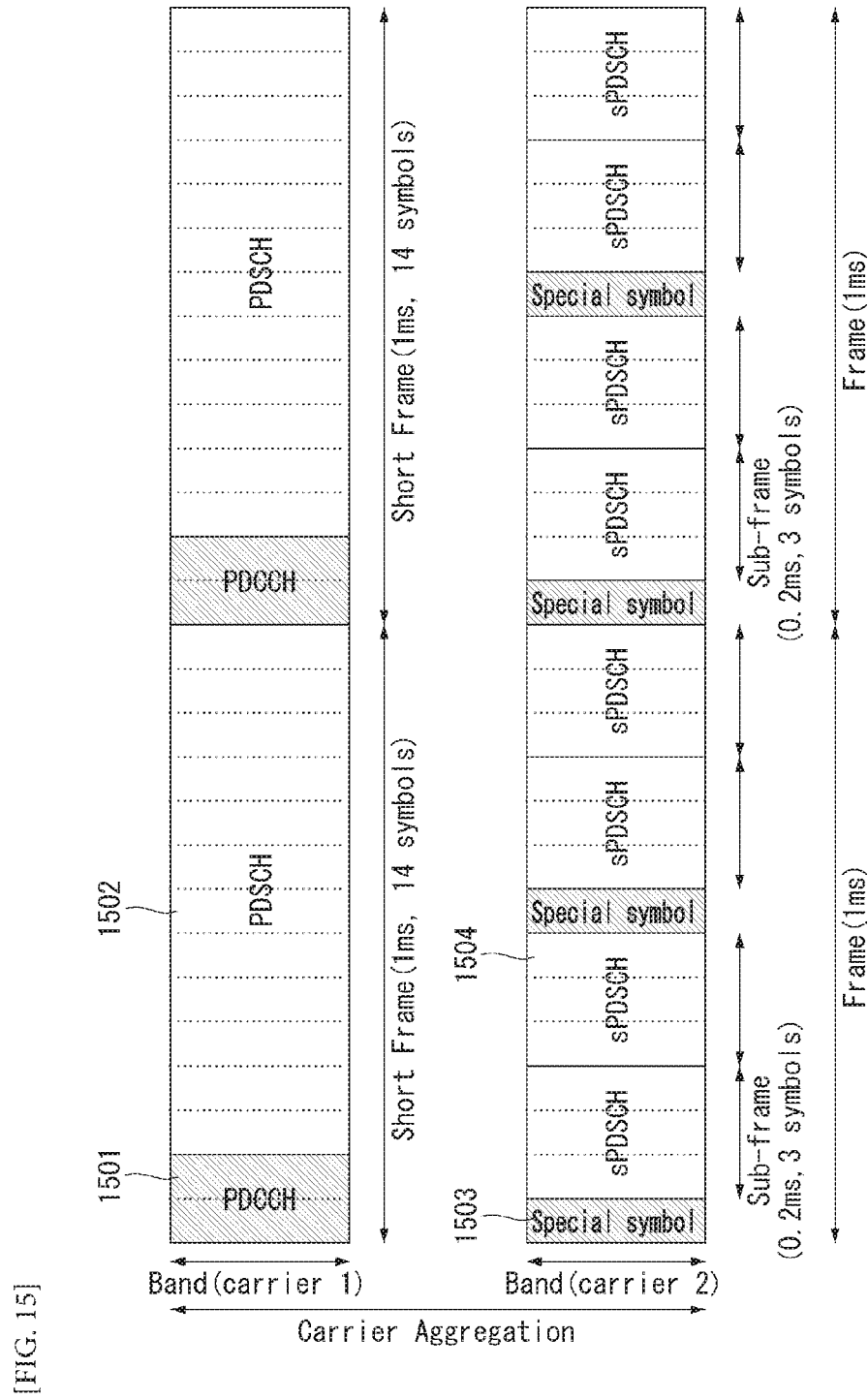
[FIG. 15]

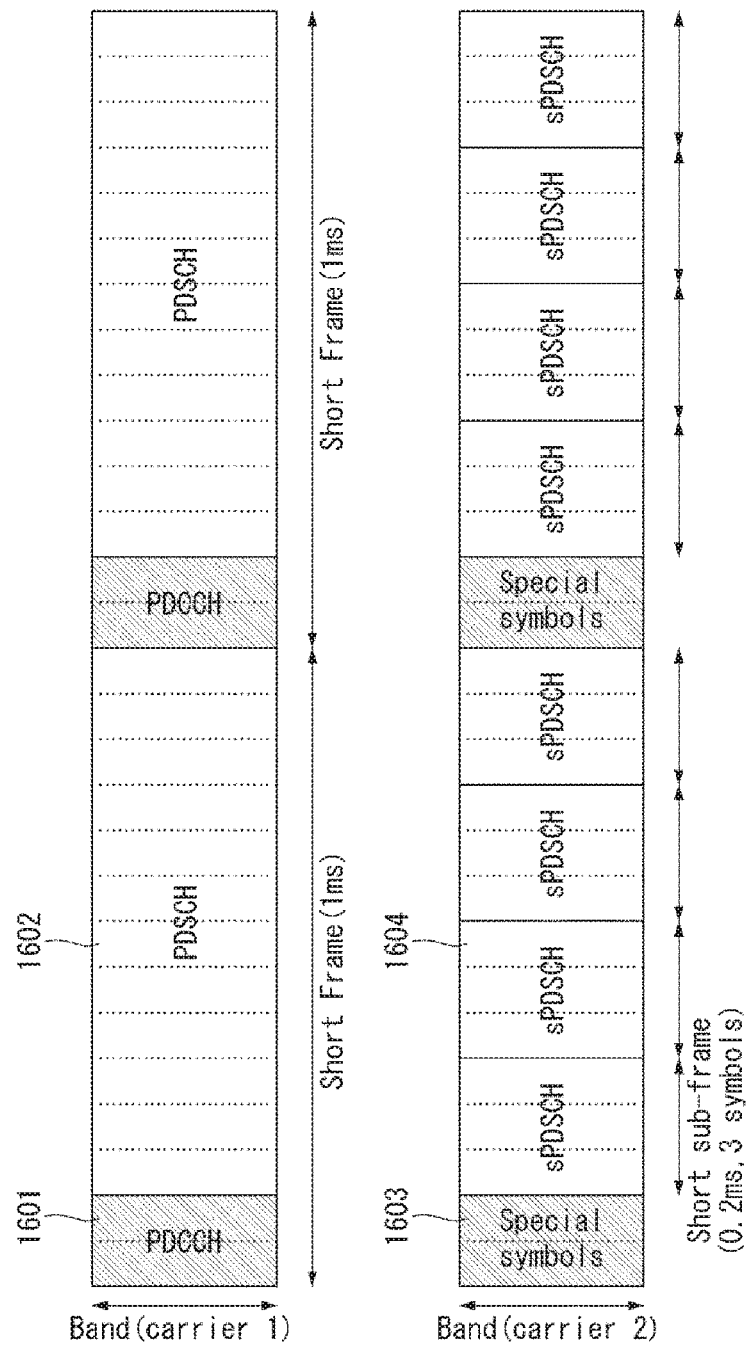
[FIG. 16]

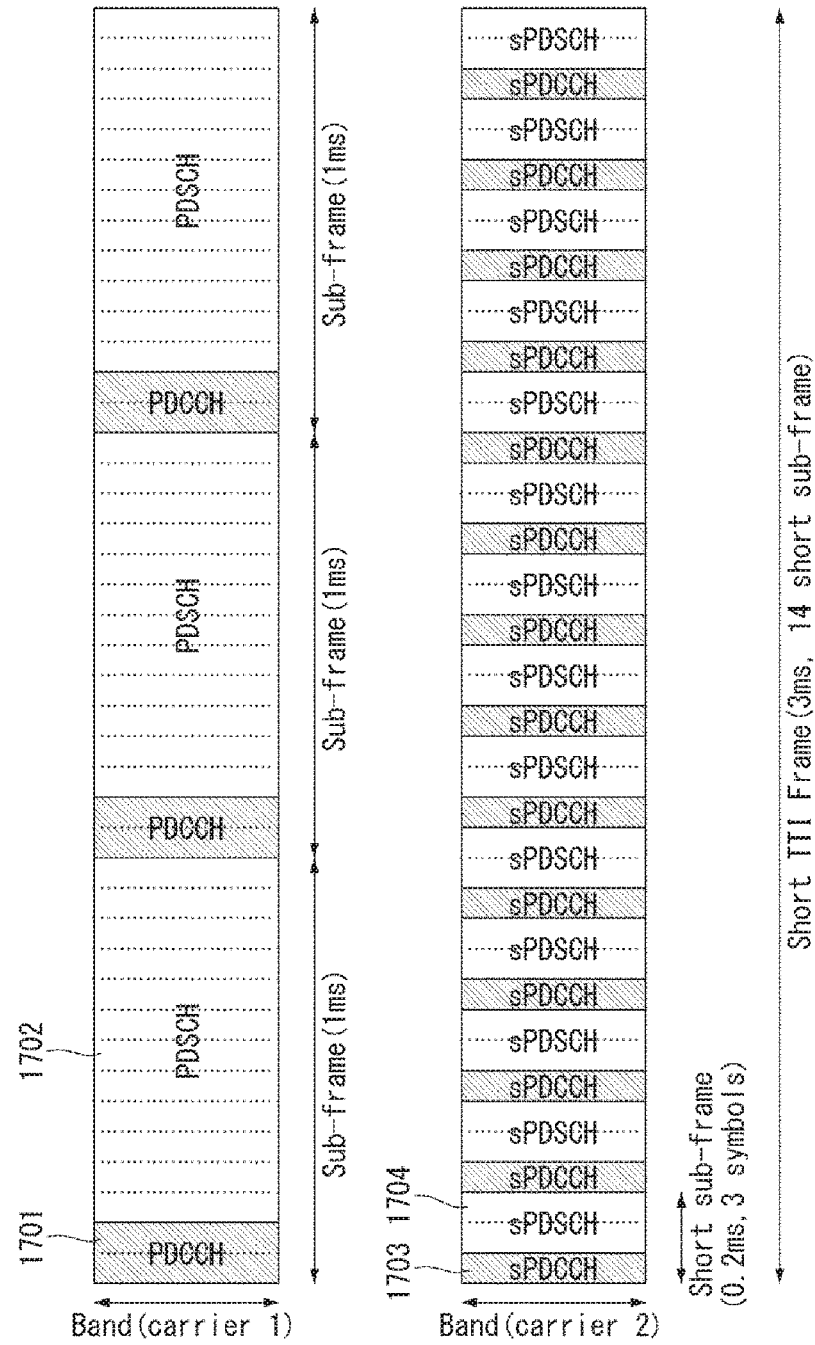
[FIG. 17]

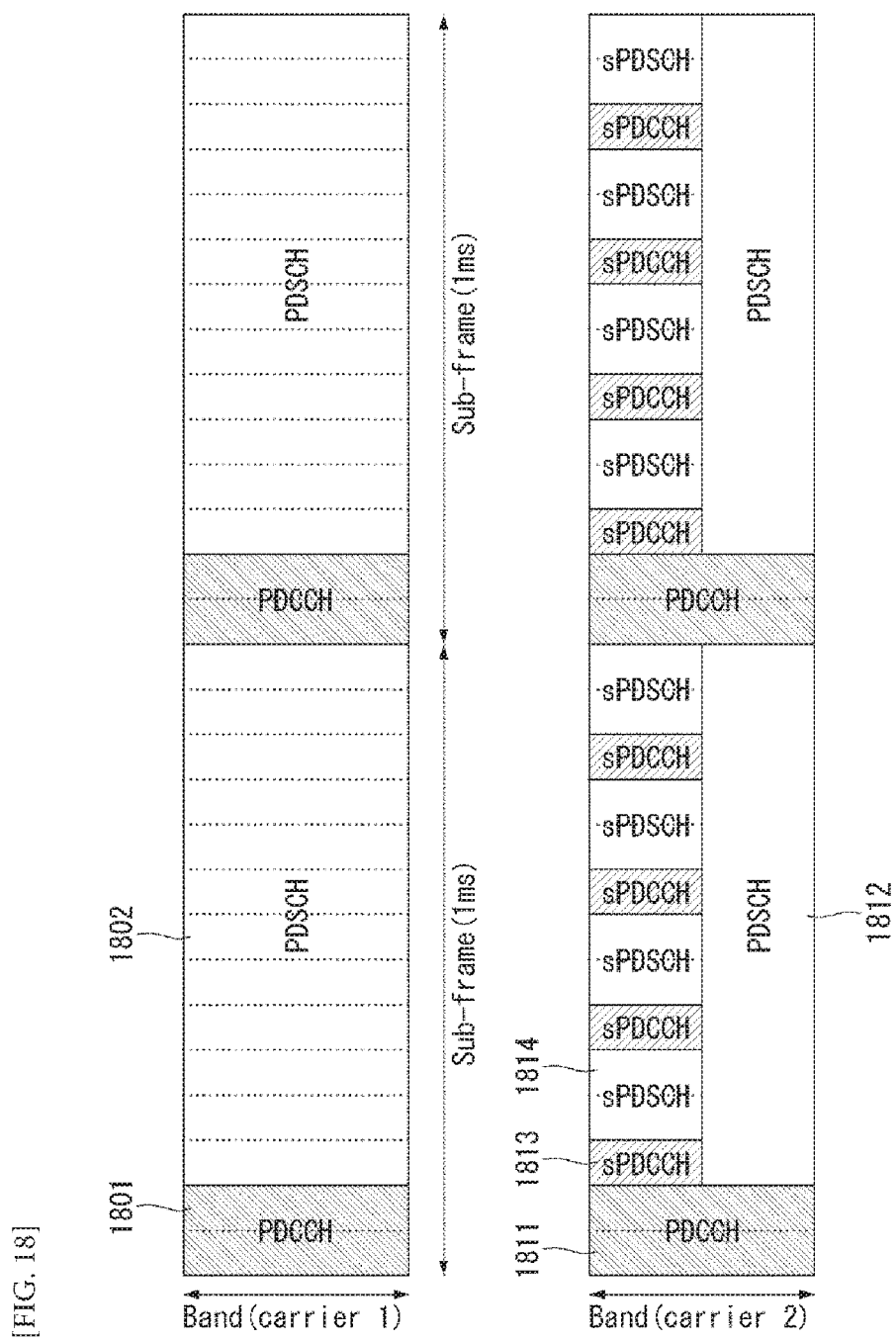
[FIG. 18]

[FIG. 19]
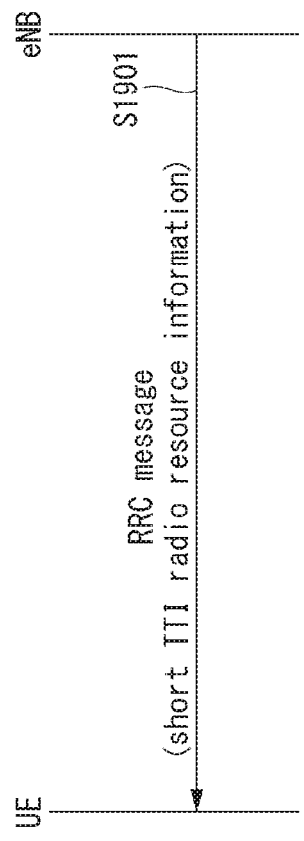

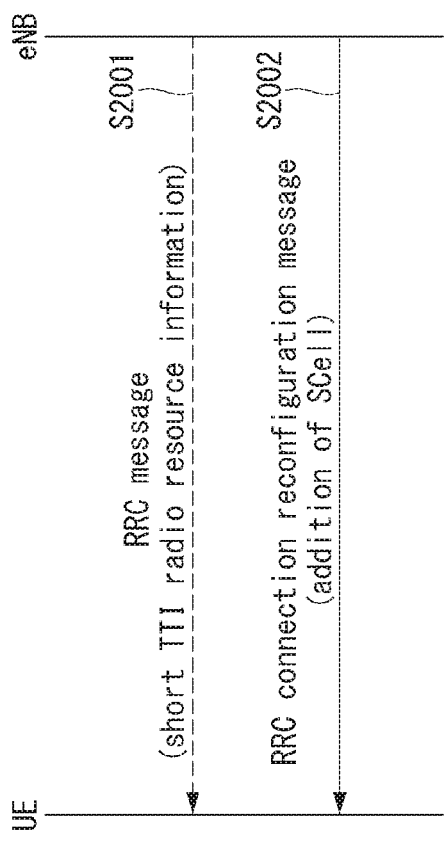
[FIG. 20]

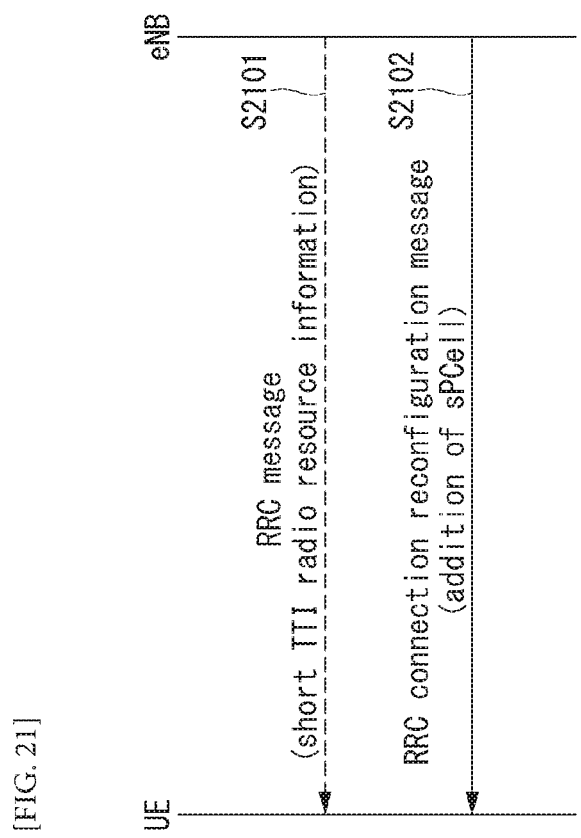

[FIG. 22]
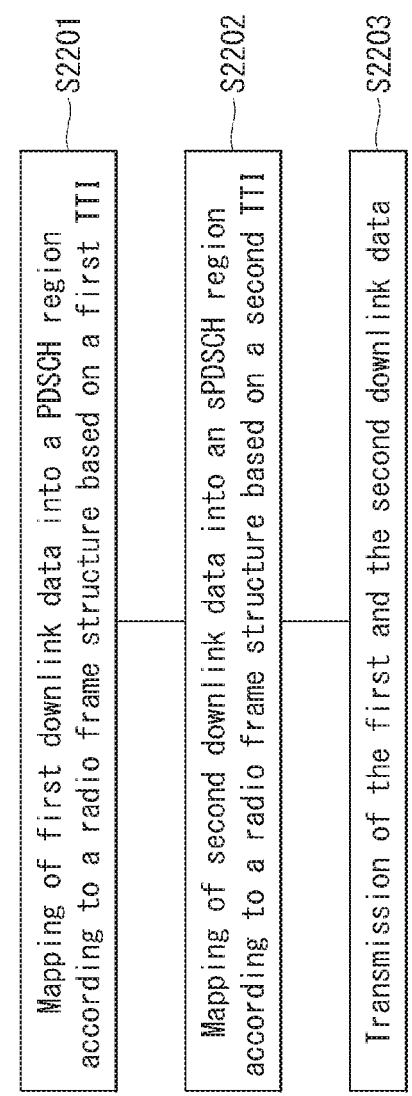

[FIG. 23]
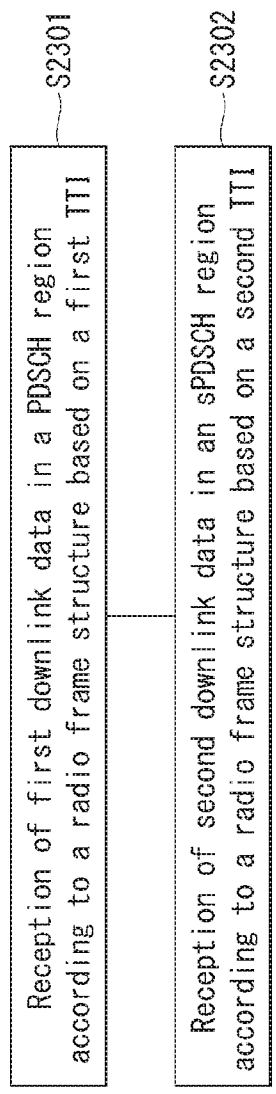

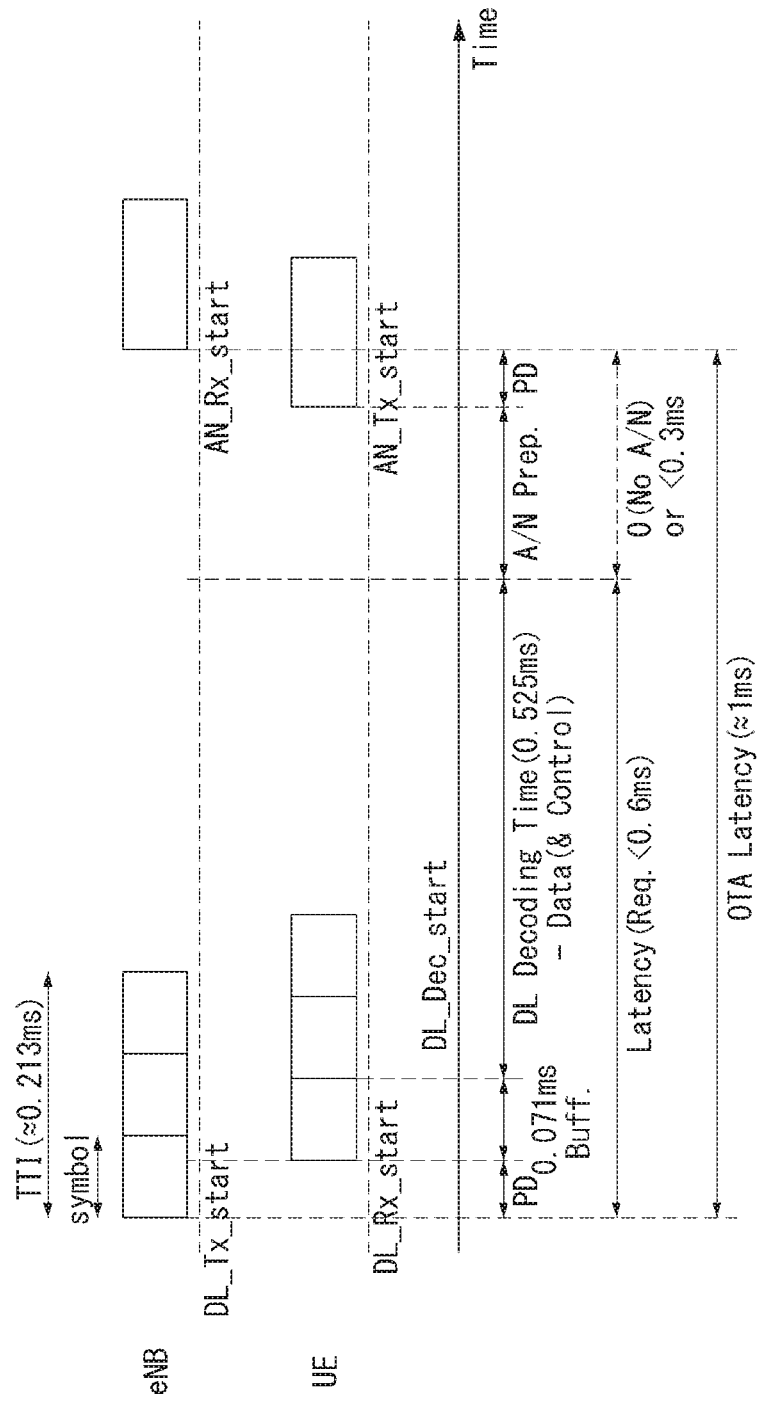
[FIG. 24]

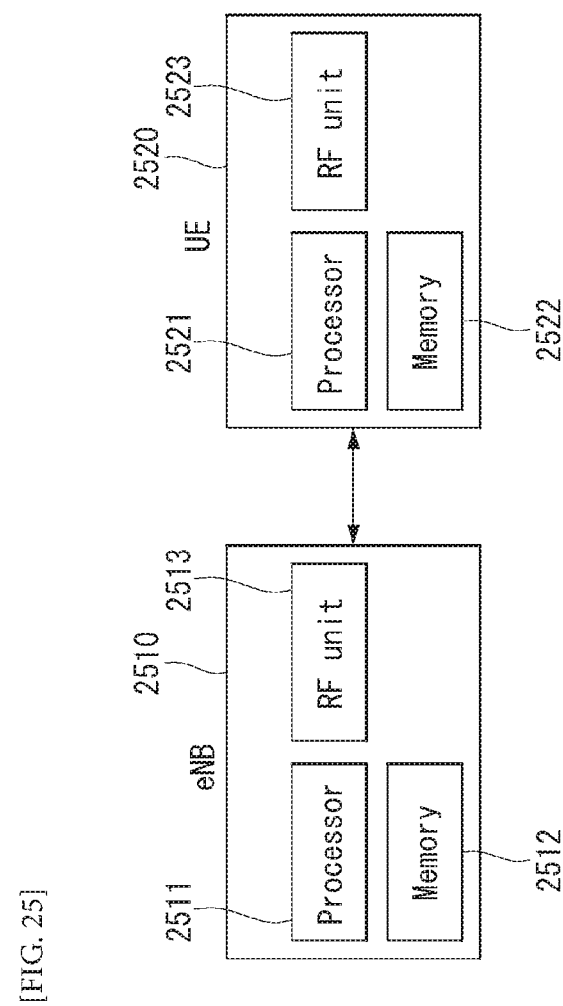
[FIG. 25]

METHOD FOR TRANSMITTING AND RECEIVING DATA IN WIRELESS COMMUNICATION SYSTEM AND APPARATUS FOR THE SAME

CROSS-REFERENCE TO RELATED APPLICATIONS

This Application is a Continuation of U.S. patent application Ser. No. 15/520,737 filed on Apr. 20, 2017 (now U.S. Pat. No. 10,411,869 issued on Sep. 10, 2019), which is the National Phase of PCT International Application No. PCT/KR2015/003457, filed on Apr. 7, 2015, which claims priority under 35 U.S.C. 119(e) to U.S. Provisional Application Nos. 62/066,860 filed on Oct. 21, 2014, 62/073,033 filed on Oct. 31, 2014, and 62/074,097 filed on Nov. 3, 2014, all of these applications are hereby expressly incorporated by reference into the present application.

BACKGROUND OF THE INVENTION

Field of the Invention

The present invention relates to a wireless communication system and more specifically, a method for transmitting and receiving data employing a radio frame structure based on a 2-level transmission time interval (TTI) in a wireless communication system and an apparatus supporting the method.

Discussion of the Related Art

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

SUMMARY OF THE INVENTION

The present invention provides a radio frame structure based on a 2-level TTI for a user equipment (UE) requiring low latency data communication in the next generation broadband wireless communication system.

Also, the present invention provides a short TTI frame structure intended for low latency transmission in sub-bands within the same band or in a particular band to minimize an effect on legacy UEs.

Also, the present invention provides a method for transmitting and receiving data employing a radio frame structure based on a newly defined 2-level TTI.

Also, the present invention provides a method for transmitting and receiving control information about data transmitted and received according to a radio frame structure based on a newly defined 2-level TTI.

The technical problems solved by the present invention are not limited to the above technical problems and those skilled in the art may understand other technical problems from the following description.

In one aspect of the present invention, a method for transmitting downlink data in a wireless communication system comprises transmitting, by an eNB, first downlink data through a physical downlink shared channel (PDSCH) region according to a radio frame structure based on a first transmission time interval (TTI); and transmitting, by the eNB, second downlink data through a short PDSCH (sPDSCH) region according to a radio frame structure based on a second TTI, wherein downlink control information (DCI) related to the second downlink data is transmitted through a physical downlink control channel (PDCCH) or a short PDCCH (sPDCCH).

In another aspect of the present invention, an eNB transmitting downlink data in a wireless communication system comprises a radio frequency (RF) unit for transmitting and receiving a radio signal and a processor, wherein the processor is configured to transmit first downlink data through a physical downlink shared channel (PDSCH) region according to a radio frame structure based on a first TTI and to transmit second downlink data through an sPDSCH region according to a radio frame structure based on a second TTI, wherein downlink control information (DCI) related to the second downlink data is transmitted through a physical downlink control channel (PDCCH) or a short PDCCH (sPDCCH).

In a yet another aspect of the present invention, a method for receiving downlink data in a wireless communication system comprises receiving, by an user equipment (UE), first downlink data through a PDSCH region according to a radio frame structure based on a first TTI and receiving, by the UE, second downlink data through an sPDSCH region according to a radio frame structure based on a second TTI, wherein downlink control information (DCI) related to the second downlink data is transmitted through a physical downlink control channel (PDCCH) or a short PDCCH (sPDCCH).

In a still another aspect of the present invention, an user equipment (UE) receiving downlink data in a wireless communication system comprises an RF unit for transmitting and receiving a radio signal and a processor, wherein the processor is configured to receive first downlink data through a PDSCH region according to a radio frame structure based on a first TTI and to receive second downlink data through an sPDSCH region according to a radio frame structure based on a second TTI, wherein downlink control information related to the second downlink data is transmitted through a physical downlink control channel (PDCCH) or a short PDCCH (sPDCCH).

Preferably, when the DCI is transmitted through the PDCCH, the DCI can include information for indicating whether the second downlink data are transmitted through the sPDSCH region.

Preferably, when the DCI is transmitted through the PDCCH, the DCI can include information for identifying an sPDSCH region through which the second downlink data are transmitted among multiple sPDSCH regions included in the first TTI.

Preferably, when the DCI is transmitted through the sPDCCH, the DCI can include control information about downlink data transmitted from multiple sPDSCH regions.

Preferably, a downlink cell to which the first downlink data are mapped is the same as the downlink cell to which the second downlink data are mapped, and one or more sub-bands within the downlink cell can be formed according to a radio frame structure based on the second TTI.

Preferably, the first downlink cell into which the first downlink data are mapped can be different from the second downlink cell into which the second downlink data are mapped, and the first downlink cell and the second downlink cell can be aggregated.

Preferably, one or more sub-bands within the second downlink cell can be formed according to a radio frame structure based on the second TTI.

By transmitting and receiving data in a radio frame structure based on a 2-level TTI, the present invention can reduce roundtrip OTA latency from the time of data transmission until a response signal with respect to the corresponding data is received.

Also, the present invention can minimize the effect on legacy UEs as a short TTI frame structure intended for low latency transmission in sub-bands within the same band or in a particular band is employed.

The effects of the present invention are not limited to the above-described effects and other effects which are not described herein will become apparent to those skilled in the art from the following description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 illustrates physical channels and a view showing physical channels used for in the 3GPP LTE/LTE-A system to which the present invention can be applied.

FIG. 2 illustrates a radio frame structure in a wireless communication system to which the present invention can be applied.

FIG. 3 shows an example of a resource grid for one downlink slot in the wireless communication system to which the present invention can be applied.

FIG. 4 shows a structure of a downlink subframe in the wireless communication system to which the present invention can be applied.

FIG. 5 shows a structure of an uplink subframe in the wireless communication system to which the present invention can be applied.

FIG. 6 shows a radio frame structure for transmission of a synchronization signal (SS) in a wireless communication system to which the present invention can be applied.

FIG. 7 illustrates a radio frame structure for transmitting a synchronization signal (SS) in a wireless communication system to which the present invention can be applied.

FIG. 8 represents an example of component carrier and carrier aggregation in the wireless communication system to which the present invention can be applied.

FIG. 9 illustrates one example of carrier aggregation in a wireless communication system to which the present invention can be applied.

FIG. 10 illustrates one example of a subframe structure according to cross carrier scheduling in a wireless communication system to which the present invention can be applied.

FIG. 11 illustrates a delay in wireless transmission and reception in the 3GPP LTE/LTE-A system to which the present invention can be applied.

FIG. 12 illustrates a radio frame structure according to one embodiment of the present invention.

FIG. 13 illustrates a radio frame structure according to one embodiment of the present invention.

FIG. 14 illustrates a radio frame structure according to one embodiment of the present invention.

FIG. 15 illustrates a radio frame structure according to one embodiment of the present invention.

FIG. 16 illustrates a radio frame structure according to one embodiment of the present invention.

FIG. 17 illustrates a radio frame structure according to one embodiment of the present invention.

FIG. 18 illustrates a radio frame structure according to one embodiment of the present invention.

FIG. 19 illustrates a method for transmitting information about a short TTI frame structure according to one embodiment of the present invention.

FIG. 20 illustrates a method for configuring carrier aggregation for a carrier-wise 2-level frame structure according to one embodiment of the present invention.

FIG. 21 illustrates a method for configuring carrier aggregation for carrier-wise 2-level frame structure.

FIG. 22 illustrates a method for transmitting and receiving data according to one embodiment of the present invention.

FIG. 23 illustrates a method for transmitting downlink data according to one embodiment of the present invention.

FIG. 24 illustrates a delay in radio transmission and reception employing a short TTI radio frame structure according to one embodiment of the present invention.

FIG. 25 is a block diagram of a wireless communication apparatus according to an embodiment of the present invention.

DESCRIPTION OF THE EMBODIMENTS

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments can be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, the enhanced Node B (eNode B or eNB) may be a terminal node of a network, which directly communicates with the terminal. In some cases, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term 'eNB' may be replaced with the term 'fixed station', 'base station (BS)', 'Node B', 'base transceiver system (BTS)', 'access point (AP)', etc. The term 'user equipment (UE)' may be replaced with the term 'terminal', 'mobile station (MS)', 'user terminal (UT)', 'mobile subscriber station (MSS)', 'subscriber station (SS)', 'Advanced Mobile Station (AMS)', 'Wireless terminal (WT)', 'Machine-Type Communication (MTC) device', 'Machine-to-Machine (M2M) device', 'Device-to-Device (D2D) device', wireless device, etc.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), 'non-orthogonal multiple access (NOMA)', etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE.

For clarity, this application focuses on the 3GPP LTE/LTE-A system. However, the technical features of the present invention are not limited thereto.

General System to which the Present Invention May be Applied

FIG. 1 illustrates physical channels and a view showing physical channels used for in the 3GPP LTE/LTE-A system to which the present invention can be applied.

When a UE is powered on or when the UE newly enters a cell, the UE performs an initial cell search operation such as synchronization with a BS in step S101. For the initial cell search operation, the UE may receive a Primary Synchronization Channel (P-SCH) and a Secondary Synchronization Channel (S-SCH) from the BS so as to perform synchronization with the BS, and acquire information such as a cell ID.

Thereafter, the UE may receive a physical broadcast channel (PBCH) from the BS and acquire broadcast information in the cell. Meanwhile, the UE may receive a Downlink Reference signal (DL RS) in the initial cell search step and confirm a downlink channel state.

The UE which completes the initial cell search may receive a Physical Downlink Control Channel (PDCCH) and a Physical Downlink Shared Channel (PDSCH) corresponding to the PDCCH, and acquire more detailed system information in step S102.

Thereafter, the UE may perform a random access procedure in steps S303 to S306, in order to complete the access to the BS. For the random access procedure, the UE may transmit a preamble via a Physical Random Access Channel (PRACH) (S103), and may receive a message in response to the preamble via the PDCCH and the PDSCH corresponding thereto (S104). In contention-based random access, a contention resolution procedure including the transmission of an additional PRACH (S105) and the reception of the PDCCH and the PDSCH corresponding thereto (S106) may be performed.

The UE which performs the above-described procedure may then receive the PDCCH/PDSCH (S107) and transmit a Physical Uplink Shared Channel (PUSCH)/Physical Uplink Control Channel (PUCCH) (S108), as a general uplink/downlink signal transmission procedure.

Control information transmitted from the UE to the BS is collectively referred to as uplink control information (UCI). The UCI includes hybrid automatic repeat and request acknowledgement/negative-acknowledgement (HARQ ACK/NACK), scheduling request (SR), channel quality information (CQI), precoding matrix indicator (PMI), rank indication (RI), etc. In the embodiments of the present invention, CQI and/or PMI are also referred to as channel quality control information.

In general, although a UCI is periodically transmitted via a PUCCH in the LTE system, this may be transmitted through a PUSCH if control information and traffic data are simultaneously transmitted. In addition, a UCI may be aperiodically transmitted via a PUSCH according to a network request/instruction.

FIG. 2 illustrates a radio frame structure in a wireless communication system to which the present invention can be applied.

A method for distinguishing radio resources used for downlink transmission from the resources for uplink transmission is called 'duplex'.

Frequency division duplex (FDD) denotes two-way communication where separate frequency bands are used for downlink and uplink transmission. According to the FDD scheme, uplink transmission and downlink transmission are carried out in the respective frequency bands.

Time division duplex (TDD) denotes duplex communication links where uplink is separated from downlink by allocating different time durations in the same frequency band.

According to the TDD scheme, uplink transmission and downlink transmission occupy the same frequency band but are carried out in different time intervals. Channel responses in the TDD scheme are actually reciprocal. The reciprocity indicates that a downlink channel response is almost the same as a uplink channel response in a given frequency band. Therefore, a wireless communication system based on the TDD scheme provides such an advantage that a downlink channel response can be obtained from a uplink channel response. Since uplink transmission and downlink transmission according to the TDD scheme are carried out in different time slots across the whole frequency band, downlink transmission by an eNB and uplink transmission by a UE cannot be carried out simultaneously. In a TDD system where uplink transmission and downlink transmission are carried out in units of a subframe, uplink transmission and downlink transmission are carried out in different subframes from each other.

The 3GPP LTE/LTE-A standard specifies a radio frame structure type 1 which can be applied to the FDD scheme and a type 2 radio frame structure which can be applied to the TDD scheme.

FIG. 2(a) illustrates a radio frame structure type 1. A radio frame consists of 10 subframes. One subframe comprises two slots in the time domain. Transmission time interval (TTI) refers to the duration for transmission of one subframe. For example, length of one subframe can be 1 ms, while length of one slot can be 0.5 ms.

One slot comprises a plurality of orthogonal frequency division multiplexing (OFDM) symbols in the time domain and a plurality of resource blocks (RBs) in the frequency domain. Since the 3GPP LTE standard utilizes OFDMA for downlink transmission, the OFDM symbol is intended to express one symbol period. One OFDM symbol can refer to one SC-FDMA symbol or one symbol period. A resource block is a unit for resource allocation and comprises a plurality of contiguous subcarriers within one slot.

FIG. 2(b) illustrates a frame structure type 2. A radio frame type 2 consists of two half frames and each half frame consists of 5 subframes, a downlink pilot time slot (DwPTS), a guard period (GP), and a uplink pilot time slot (UpPTS) of which one subframe comprises two slots. The DwPTS is used for initial cell search, synchronization, or channel estimation in a UE. The UpPTS is used for channel estimation and synchronization of uplink transmission with a UE. The GP is intended to remove interference exerted on uplink transmission due to a multi-path delay of a downlink signal between uplink and downlink transmission.

In the type 2 frame structure of the TDD system, uplink-downlink configuration represents a rule as to whether uplink and downlink are allocated (or reserved) with respect to all of the subframes. Table 1 illustrates uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

With respect to Table 1, for each subframe of a radio frame, 'D' represents a subframes for downlink transmission, 'U' represents a subframe for uplink transmission', and 'S' represents a special subframe consisting of three-types of fields: DwPTS, GP, and UpPTS. There can be seven different uplink-downlink configurations, where positions and/or the number of downlink subframes, special subfrans, and uplink subframes of each configuration are different from those of the others.

A time point at which downlink transmission is changed to uplink transmission or vice versa is called a switching point. The switch-point periodicity refers to a period at which switching between a uplink subframe and a downlink subframe is repeated in the same manner, and a switch-point periodicity of 5 ms or 10 ms is supported. In the case of a switch-point periodicity of 5 ms, a special subframe(s) is defined for every half-subframe, while, in the case of a switch-point periodicity of 10 ms, the special subframes(s) are defined only for a first half-frame.

For each configuration, the 0-th, 5-th subframe, and DwPTS correspond to time slots intended only for downlink transmission. UpPTS and a special subframe right next to the subframe are always used for uplink transmission.

The uplink-downlink configuration described above can be known to both of the eNB and the UE as system information. By transmitting only the index of a uplink-downlink configuration each time the configuration is changed, the eNB can inform the UE of the change in the uplink-downlink allocation state of a radio frame. Also, configuration information can be transmitted as downlink control information through a physical downlink control channel (PDCCH) in the same manner as other scheduling information, and may be transmitted as broadcast information commonly to all of the UEs within a cell through a broadcast channel.

The radio frame structure is only an example, and the number of sub-carriers included in a radio frame or the number of slots included in a sub-frame, and the number of OFDM slots included in a slot can be changed in various ways.

FIG. 3 shows an example of a resource grid for one downlink slot in the wireless communication system to which the present invention can be applied.

Referring to the FIG. 3, the downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block includes 12×7 resource elements. The resource element on the resource grid may be identified by an index pair (k, l) in the slot. Here, k (k=0, . . . , NRB×12-1) denotes an index of subcarrier in the frequency domain, and l (l=0, . . . , 6) denotes an index of symbol in the time domain. The number NDL of resource blocks included in the downlink slot depends on a downlink transmission bandwidth determined in a cell.

FIG. 4 shows a structure of a downlink subframe in the wireless communication system to which the present invention can be applied.

Referring to the FIG. 4, a maximum of three OFDM symbols located in a front portion of a first slot in a subframe correspond to a control region to be assigned with control channels. The remaining OFDM symbols correspond to a data region to be assigned with physical downlink shared channels (PDSCHs).

Examples of downlink control channels used in the 3GPP LTE include a physical control format indicator channel (PCFICH), a physical downlink control channel (PDCCH), a physical hybrid-ARQ indicator channel (PHICH), etc. The PCFICH transmitted in a 1st OFDM symbol of a subframe carries information regarding the number of OFDM symbols (i.e., a size of a control region) used for transmission of control channels in the subframe. Control information transmitted over the PDCCH is referred to as downlink control information (DCI). The DCI transmits uplink resource assignment information, downlink resource assignment information, an uplink transmit power control (TPC) command for any UE groups, etc. The PHICH carries an acknowledgement (ACK)/not-acknowledgement (NACK) signal for an uplink hybrid automatic repeat request (HARQ). That is, the ACK/NACK signal for uplink data transmitted by a UE is transmitted over the PHICH.

A BS determines a PDCCH format according to DCI to be transmitted to a UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC. To indicate a random access response that is a response for transmission of a random access preamble of the UE, a random access-RNTI (RA-RNTI) may be masked to the CRC.

FIG. 5 shows a structure of an uplink subframe in the wireless communication system to which the present invention can be applied.

Referring to the FIG. 5, the uplink subframe can be divided in a frequency domain into a control region and a data region. The control region is allocated with a physical uplink control channel (PUCCH) for carrying uplink control information. The data region is allocated with a physical uplink shared channel (PUSCH) for carrying user data. In case of being indicated from higher layer, UE can simultaneously transmit the PUCCH and the PUSCH.

The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

FIG. 6 shows a radio frame structure for transmission of a synchronization signal (SS) in a wireless communication system to which the present invention can be applied.

In particular, FIG. 6 illustrates a radio frame structure for transmission of a synchronization signal and a PBCH in frequency division duplex (FDD) mode, where FIG. 6(a) illustrates a transmission position of an SS and a PBCH in a radio frame employing normal cyclic prefixes (CPs), and FIG. 6(b) illustrates a transmission position of an SS and a PBCH in a radio frame employing extended CP.

In case a UE is powered up or enters a new cell, the UE carries out an initial cell search procedure to obtain time and frequency synchronization with the cell and to detect a physical cell identity of the cell. To this purpose, the UE can receive from the eNB a synchronization signal, for example, a primary synchronization signal (PSS) and a secondary synchronization signal (SSS) to synchronize with the eNB and obtain information about a cell identity (ID).

In the following, an SS will be described in more detail with reference to FIG. 6.

An SS is further divided into a PSS and an SSS. A PSS is used to obtain time domain synchronization and/or frequency domain synchronization such as OFDM symbol synchronization and slot synchronization, and an SSS is used to obtain frame synchronization and cell group ID and/or CP configuration of a cell (namely, usage information of normal CP or extended CP).

With reference to FIG. 6, a PSS and an SSS are transmitted respectively from two OFDM symbols of each radio frame in the time domain. To be specific, an SS is transmitted from the first slot of subframe 0 and the first slot of subframe 5 by taking account of the length of a GSM (Global System for Mobile communication) frame, 4.6 ms, to facilitate measurement of inter radio access technology (inter-RAT). In particular, a PSS is transmitted respectively from the last OFDM symbol of the first slot of subframe 0 and the last OFDM symbol of the first slot of subframe 5; and an SSS is transmitted respectively from the next to last OFDM symbol of the first slot of subframe 0 and the next to last OFDM symbol of the first slot of subframe 5.

Boundaries of the corresponding radio frames can be detected through the SSS. A PSS is transmitted from the very last OFDM symbol of the corresponding slot, and an SSS is transmitted from the OFDM symbol right before the PSS. A transmission diversity scheme for the SS makes use of a single antenna port only and is not separately defined in the standard. In other words, single antenna port transmission or transparent transmission to a UE (for example, precoding vector switching (PVS), time switched diversity (TSTD), cyclic delay diversity (CDD)) can be used for transmission diversity of an SS.

With reference to FIG. 6, since a PSS is transmitted every 5 ms, by detecting the PSS, the UE can know that the corresponding subframe is either of subframe 0 or subframe 5, but is unable to which one of the two the corresponding subframe corresponds. Therefore, with the PSS alone, the UE cannot recognize radio frame boundaries. In other words, frame synchronization cannot be attained from the PSS only. The UE detects radio frame boundaries by detecting the SSS which is transmitted twice within one radio frame but transmitted in a different sequence.

FIG. 7 illustrates a radio frame structure for transmitting a synchronization signal (SS) in a wireless communication system to which the present invention can be applied.

With reference to FIG. 7, a PSS and an SSS are mapped to 6 RBs located in the center of downlink system bandwidth. The total number of RBs in downlink transmission can vary depending upon system bandwidth (for example, 6 RBs to 110 RBs). Since the PSS and the SSS are mapped to 6 RBs located in the center of the downlink system bandwidth, the UE can detect the PSS and the SSS by using the same method independently of the downlink system bandwidth.

The PSS and the SSS are all composed of a sequence of length 62. Therefore, among the 6 RBs, the PSS and the SSS are mapped to the central 62 subcarriers located at both sides of a DC subcarrier, and 5 subcarriers located respectively at the both ends of the 6RBs and the DC subcarrier are not used.

A UE can obtain a physical layer cell ID by using a particular sequence of the PSS and the SSS. In other words, an SS can represent a total of 504 unique physical layer cell IDs through a combination of 3 PSSs and 168 SSs.

Put differently, the physical layer cell IDs are grouped to 168 physical layer cell ID groups, each of which includes three unique IDs, so that each physical layer cell ID can belong to only one physical layer cell ID group. Therefore, a physical layer cell, ID Ncell ID=3N(1) ID+N(2) ID, is uniquely defined by the number N(1) ID ranging from 0 to 167 and representing a physical layer cell ID group; and the number N(2) ID ranging from 0 to 2 and representing the physical layer ID within the physical layer cell ID group.

The UE, by detecting the PSS, can distinguish one of the three unique physical layer IDs and can identify one of the 168 physical layer cell IDs associated with the physical layer ID by detecting the SSS.

The PSS is generated based on a Zadoff-Chu (ZC) sequence. Three ZC PSSs corresponding respectively to the three physical layer IDs within each physical layer cell ID group are used.

The SSS is generated based on an M-sequence. Each SSS sequence is generated by interleaving two SSC 1 sequence and SSC 2 sequence with a length of 31 in the frequency domain in an alternate fashion. At this time, the SSC 1 sequence and the SSC 2 sequence are generated as a different cyclic shift value is applied to the M-sequence of length 31. At this time, the cyclic shift index is determined by a function of physical layer cell ID groups.

Carrier Aggregation

A communication environment considered in the embodiments of the present invention includes all multi-carrier environments. That is, a multi-carrier system or a carrier aggregation (CA) system used in the present invention refers to a system for aggregating and utilizing one or more component carriers having a bandwidth smaller than a target bandwidth, for wideband support.

In the present invention, multi-carrier refers to carrier aggregation. Carrier aggregation includes aggregation of contiguous carriers and aggregation of non-contiguous carriers. In addition, the number of component carriers aggregated in downlink and uplink may be differently set. The case where the number and/or bandwidth of downlink component carriers (DL CCs) and the number and bandwidth of uplink component carriers (UL CCs) are the same is referred to as symmetric aggregation and the case where the number and/or bandwidth of downlink component carriers (DL CCs) and the number and bandwidth of uplink component carriers (UL CCs) are different is asymmetric aggregation. Such carrier aggregation is used interchangeable with the terms "carrier aggregation", "bandwidth aggregation" or "spectrum aggregation".

Carrier aggregation configured by aggregating two or more CCs aims at support a bandwidth of up to 100 MHz in an LTE-A system. When one or more carriers having a bandwidth smaller than a target bandwidth are aggregated, the bandwidth of the aggregated carriers may be restricted to a bandwidth used in the existing system, for backward compatibility with the existing IMT system. For example, the existing 3GPP LTE system may support bandwidths of 1.4, 3, 5, 10, 15 and 20 MHz and an LTE_Advanced (LTE_A) system evolved from the LTE system may support a bandwidth greater than 20 MHz using only the bandwidths supported by the LTE system. Alternatively, the carrier aggregation system used in the present invention may define a new bandwidth so as to support CA, regardless of the bandwidths used in the existing system.

The above-described carrier aggregation environment may be called a multiple-cell environment. The cell is defined as a combination of downlink resources (DL CCs) and uplink resources (UL CCs), and the uplink resources are not mandatory. Accordingly, the cell may be composed of downlink resources alone or both downlink resources and uplink resources. If a specific UE has one configured serving cell, the UE may have one DL CC and one UL CC. If a specific UE has two or more configured serving cells, the UE may have DL CCs corresponding in number to the number of cells and the number of UL CCs may be equal to or less than the number of DL CCs, and vice versa. If a specific UE has a plurality of configured service cells, a carrier aggregation environment in which the number of DL CCs is greater than the number of UL CCs may also be supported. That is, carrier aggregation may be regarded as aggregation of two or more cells having different carrier frequencies (center frequencies of a cell). If carrier aggregation is supported, linkage between a carrier frequency (or a DL CC) of downlink resources and a carrier frequency (or a UL CC) of uplink resources may be indicated by system information.

The DL CC and the UL CC may be referred to as DL cell and UL cell, respectively. The cell described herein should be distinguished from a "cell" as a general region covered by a BS.

A cell used in the LTE-A system includes a primary cell (PCell) and a secondary cell (SCell). The PCell and the SCell may be used as service cells. In case of a UE which is in an RRC_connected state but does not set carrier aggregation or supports carrier aggregation, only one serving cell composed of a PCell exists. In contrast, in case of a UE which is in an RRC_CONNECTED state and sets carrier aggregation, one or more serving cells exist. The serving cell includes a PCell and one or more SCell.

A serving cell (PCell and SCell) may be set through an RRC parameter. PhyCellId is a physical layer identifier of a cell and has an integer value from 0 to 503. SCellIndex is a short identifier used to identify an SCell and has an integer value from 1 to 7. A value of 0 is applied to the PCell and SCellIndex is previously given to be applied to the Scell. That is, a cell having a smallest cell ID (or a cell index) in ServCellIndex becomes the PCell.

The PCell refers to a cell operating on a primary frequency (e.g., a primary CC (PCC)). The PCell is used to perform an initial connection establishment process or a connection re-establishment process at a UE. The PCell may indicate a cell indicated in a handover process. The PCell refers to a cell for performing control-associated communication among serving cells set in a carrier aggregation environment. That is, a UE may receive a PUCCH allocated by a PCell to which the UE belongs and perform transmission and use only the PCell to acquire system information and change a monitoring procedure. In evolved universal terrestrial radio access (E-UTRAN), a UE supporting a carrier aggregation environment may change only the PCell for a handover procedure using an RRCConnectionReconfiguration message of a higher layer including mobilityControlInfo.

The SCell refers to a cell operating on a secondary frequency (e.g., a secondary CC (SCC)). Only one PCell may be allocated to a specific UE and one or more SCells may be allocated to the specific UE. The SCell may be configured after radio resource control (RRC) connection establishment and may be used to provide additional radio resources. A PUCCH is not present in cells except for the PCell among serving cells set in a carrier aggregation environment, that is, the SCells. E-UTRAN may provide all system information associated with the operation of an associated cell in an RRC_CONNECTED state via a dedicated signal when SCells are added to a UE supporting a carrier aggregation environment. Change of system information may be controlled by release and addition of the SCell. At this time, an RRCConnectionReconfiguration message of a higher layer may be used. The E-UTRAN may transmit a dedicated signal having a different parameter to each UE, rather than broadcasting a signal in the associated SCell.

After an initial security activation process begins, an E-UTRAN may configure a network by adding one or more SCells to a PCell initially configured in a connection establishment process. In a carrier aggregation environment, the PCell and the SCell may operate as respective CCs. In the following embodiments, a primary CC (PCC) may be used as the same meaning as the PCell and a secondary CC (SCC) may be used as the meaning as the SCell.

FIG. 8 represents an example of component carrier and carrier aggregation in the wireless communication system to which the present invention can be applied.

FIG. 8 (a) represents a single carrier structure that is used in a LTE system. There are DL CC and UL CC in component carrier. One component carrier may have 20 MHz frequency range.

FIG. 8 (b) represents a carrier aggregation structure that is used in a LTE-A system. FIG. 8 (b) represents a case that three component carriers having 20 MHz frequency are aggregated. There are three DL CCs and UL CCs respectively, but the number of DL CCs and UL CCs are not limited thereto. In case of the carrier aggregation, the UE enables to monitor three CCs at the same time, to receive the DL signal/data, and to transmit the UL signal/data.

If, N DL CCs are managed in a specific cell, the network may allocate M (MEN) DL CCs. In this case, the UE may monitor the limited M DL CCs only and receive the DL signal. Also, the network may give a priority to L (LSM_N) DL CCs and have the prioritized DL CCs allocated to the UE, in this case, the UE should monitor the DL CCs without fail. This way may be applied for the UL transmission.

The linkage between the DL resource carrier frequency (or DL CC) and the UL resource carrier frequency (or UL CC) may be instructed by a higher layer message like RRC message or system information. For example, the combination of DL resource and UL resource may be configured by the linkage that is defined by system information block type 2 (SIB2). Particularly, the linkage may signify the mapping relationship between the DL CC through which the PDCCH carrying a UL grant is transmitted and the UL CC that uses the UL grant, or signify the mapping relationship between the DL CC (or UL CC) through which the data for HARQ is transmitted and the UL CC (or DL CC) through which the HARQ ACK/NACK signal is transmitted.

FIG. 9 illustrates one example of carrier aggregation in a wireless communication system to which the present invention can be applied.

FIG. 9(a) illustrates aggregation of contiguous carriers (namely, F1, F2, and F3), and FIG. 9(b) illustrates aggregation of non-contiguous carriers (namely, F1, F2, and F3).

With reference to FIG. 9, there is no need for component carriers set up for carrier aggregation to be contiguous to each other in the frequency domain. Therefore, a network operator can provide a high data rate service requiring a broad band by using fragmented spectrum without relying on homogeneous broadband spectrum allocation.

Also, carrier aggregation can be classified into intra-band aggregation within the same band and inter-band aggregation and should be understood to refer to both of the two cases.

Aggregation of contiguous carriers can correspond to intra-band aggregation within the same band. On the other hand, aggregation of non-contiguous carriers can correspond not only to intra-band aggregation within the same band but also to inter-band aggregation.

For each cell involved in carrier aggregation, capability is defined in a cell-specific manner, which indicates the number of carriers available for the cell. How to use the available carriers can be determined in a UE-specific manner. In other words, incase three carriers, F1, F2, F4, are available in a cell, a specific UE may use F1 and F2 through carrier aggregation, while another UE may use F2 and F4 through carrier aggregation.

Cross Carrier Scheduling

In case a particular UE aggregates one or more carriers, a PCell and an SCell are defined for the UE to operate the corresponding carriers. In other words, carriers assigned to a PCell should always operate in an activated state, while those carriers assigned to an SCell may be activated or deactivated depending on the needs. At this time, with respect to a UE for which more than one SCell is activated, scheduling of data transmitted to the SCell can be carried out as follows.

In a carrier aggregation system, in view of scheduling of carriers (or carrier waves) or serving cells, two methods can be employed: a self-scheduling method and a cross carrier scheduling method. Cross carrier scheduling can be called cross component carrier scheduling or cross cell scheduling.

In cross carrier scheduling, a PDCCH (DL Grant) and a PDSCH are transmitted to different DL CCs, or a PUSCH transmitted according to the PDCCH (UL Grant) transmitted from the DL CC is transmitted to a different UL CC rather than the UL CC linked to the DL CC which has received the UL grant.

Cross carrier scheduling can be activated or deactivated in a UE-specific manner and can be notified to each UE in a semi-static manner through upper layer signaling (for example, RRC signaling).

In case cross carrier scheduling is activated, a carrier indicator field (CIF) is needed, which informs a PDCCH about through which DL/UL cc the PDSCH/PUSCH indicated by the corresponding PDCCH is transmitted. For example, a PDCCH can allocate PDSCH resources or PUSCH resources to one of a plurality of component carriers by using the CIF. In other words, the CIF is set when a PDCCH on a DL CC allocates PDSCH or PUSCH resources to one of multi-aggregated UL/UL CCs. In this case, the DCI format of the LTE-A release-8 can be extended according to the CIF. Then the CIF can be fixed as a 3 bit field, or location of the CIF can be fixed independently of the size of the DCI format. Also, the PDCCH structure of the LTE-A release-8 (resource mapping based on the same coding and the same CCE) may be re-used.

When cross carrier scheduling is activated, it is necessary for a UE to monitor a PDCCH with respect to a plurality of DCIs in the control region of a monitoring CC according to a transmission mode and/or bandwidth for each CC. Therefore, along with PDCCH monitoring, it is necessary to construct a search space to support the PDCCH monitoring.

In a carrier aggregation system, a UE DL CC set represents a set of DL CCs scheduled so that a UE can receive a PDSCH, while a UE UL CC set represents a set of UL CCs scheduled so that a UE can transmit a PUSCH. Also, a PDCCH monitoring set represents a set consisting of at least one DL CC which carries out PDCCH monitoring. A PDCCH monitoring set may be the same as the UE DL CC set or a subset of the UE DL CC set. The PDCCH monitoring set can include at least one of the DL CCs of the UE DL CC set. Or the PDCCH monitoring set can be defined independently of the UE DL CC set. A DL CC included in the PDCCH monitoring set can be configured so that self-scheduling with respect to a UL CC linked to the DL CC is always possible. The UE DL CC set, UE UL CC set, and PDCCH monitoring set can be configured in a UE-specific, in a UE group-specific, or in a cell-specific manner.

In case cross carrier scheduling is deactivated, it indicates that a PDCCH monitoring set is always the same as a UE DL CC set; in this case, an indication such as separate signaling with respect to the PDCCH monitoring set is not needed. However, in case cross carrier scheduling is activated, it is preferable that the PDCCH monitoring set is defined within the UE DL CC set. In other words, to schedule a PDSCH or a PUSCH with respect to a UE, an eNB transmits a PDCCH only through the PDCCH monitoring set.

FIG. 10 illustrates one example of a subframe structure according to cross carrier scheduling in a wireless communication system to which the present invention can be applied.

Referring to FIG. 10, three DL CCs are concatenated in a DL subframe intended for a LTE-A UE, and the DL CC 'A' is configured to be a PDCCH monitoring DL CC. In case CIF is not used, each DL CC can transmit a PDCCH which schedules its own PDSCH without employing a CIF. On the other hand, in case the CIF is used through upper layer signaling, only the DL CC 'A' can transmit a PDCCH which schedules its own PDSCH or a PDSCH of another CC by using the CIF. At this time, the DL CC 'B' and 'C' not configured as a PDCCH monitoring DL CC do not transmit a PDCCH.

2-Level Radio Frame Structure and a Method for Transmitting and Receiving Data

The LTE/LTE-A system has a frame structure having a 1 ms transmission time interval (TTI), and in most cases, requested delay time of data for video applications is approximately 10 ms.

However, future 5G technology is facing demand for a much lower delay in data transmission due to advent of new applications such as real-time control and tactile Internet, and it is expected that the required delay time for data transmission in the 5G technology will be reduced down to about 1 ms.

However, the existing frame structure having a 1 ms TTI has an inherent problem that the requirement of 1 ms delay for data transmission cannot be met.

FIG. 11 illustrates a delay in wireless transmission and reception in the 3GPP LTE/LTE-A system to which the present invention can be applied.

FIG. 11 illustrates a reference delay in wireless transmission and reception in view of downlink transmission and reception of the 3GPP LTE system having a 1 ms subframe.

Referring to FIG. 11, a propagation delay (PD) is generated between the time the eNB starts transmission of a downlink subframe and the time the UE starts receiving the downlink subframe. And a buffering delay is occurred as the UE buffers the downlink subframe before decoding the downlink subframe. A delay due to a propagation delay with respect to downlink subframe transmission and buffering in the UE amounts to a total of approximately 0.5 ms. And the UE decodes a PDCCH in a downlink subframe and decodes a PDSCH based on the PDCCH decoding information. A processing delay due to the PDCCH decoding (approximately 0.5 ms) and the PDSCH delay (less than approximately 2 ms) measures to be less than approximately 2.5 ms.

In this manner, the one-way over-to-air (OTA) latency from the eNB to the UE becomes less than approximately 3 ms.

And a delay for ACK/NACK (A/N) preparation in the UE (for example, ACK/NACK encoding) and a propagation delay generated at the time of transmitting the A/N require less than a total of approximately 1 ms.

In this way, for one way data transmission, approximately 4 ms is normally required for a total roundtrip OTA latency from a transmitter-side (for example, the eNB) until the ACK/NACK is received at a receiver-side (for example, the UE).

The 5G wireless communication system aims to provide a data delay reduced by about ten times of the existing wireless communication system. To achieve the goal, the 5G system is expected to adopt a new frame structure having a shorter TTI (for example, 0.2 ms).

It is also anticipated that the 5G system is confronted with not only the low latency but also applications demanding various requirements such as high capacity, low energy consumption, low cost, and high user data rate. Thus, the 5G system is expected to evolve to such a system different from the existing ones to support various kinds of applications ranging from the ones demanding ultra-low latency to those demanding a high data rate.

Therefore, to minimize a data reception delay in a UE, a new frame structure different from those of the existing wireless communication systems needs to be defined, and an effect on legacy UEs due to the new frame has to be minimized.

The present invention, to provide a user with various services demanding disparate requirements, proposes a system which provides more than one frame structure to a particular UE.

In other words, by defining a frame structure for each sub-band (or a sub-band group or a band/carrier), the present invention defines more than one service-specific sub-band (or sub-band group or a band/carrier). For example, the present invention supports so that the existing 1 ms TTI frame structure for ordinary data transmission and a short TTI frame structure for data transmission demanding low latency can be employed for a particular UE.

In what follows, a short TTI can be understood to have the same meaning as a short TTI subframe (or a short subframe). That is to say, in case both of the control region and the data region are defined in one short subframe, the short TTI has the size covering both of the control and the data region, while, in case only the data region is defined within the short subframe, the short TTI has the size covering only the data region.

In what follows, for the convenience of descriptions, a radio frame structure employing normal CP of the FDD type according to an embodiment of the present invention will be described. It should be noted, however, that the present invention is not limited to the aforementioned embodiment but can be applied in the same way for a radio frame structure of the TDD type or a radio frame structure employing extended CP.

Subband-Wise 2-Level Frame Structure

The 3GPP LTE/LTE-A system defines a sub-band as a set of resource blocks (RBs). $N_{RB}^{sb}$ represents the size of each sub-band and denotes the number of RBs. $N_{RB}^{sb}$ can be calculated by the Equation 1 below.

$$N_{RB}^{sb} = \begin{cases} N_{RB}^{UL} & N_{sb} = 1 \\ \lfloor (N_{RB}^{UL} - N_{RB}^{HO} - N_{RB}^{HO} \bmod 2)/N_{sb} \rfloor & N_{sb} > 1 \end{cases} \quad \text{[Equation 1]}$$

In Equation 1, $N_{sb}$ represents the number of sub-bands and is determined by an upper layer.

$N_{RB}^{UL}$ represents uplink bandwidth configuration and is expressed by resource block size (namely, the number of sub-carriers per resource block, $N_{sc}^{RB}$).

$N_{RB}^{HO}$ represents an offset used for frequency hopping ('pusch-HoppingOffset') and is expressed by the number of resource blocks. $N_{RB}^{HO}$ and hopping-mode related parameters (namely, inter-subframe or intra and inter-subframe) are determined by an upper layer.

The equation above illustrates an example where a sub-band is calculated based on uplink bandwidth, but the present invention can define more than one sub-band similarly for downlink bandwidth and/or uplink bandwidth.

As described above, one downlink and/or uplink band (namely, a carrier or a cell) can be divided into a plurality of sub-bands. In what follows, described will be a method for composing more than one sub-band (or sub-band group or band/carrier) within one downlink and/or uplink band by employing a short TTI frame structure.

In what follows, for the sake of convenience, the method will be described with respect to a downlink band (namely, a carrier or a cell).

FIG. 12 illustrates a radio frame structure according to one embodiment of the present invention.

With reference to FIG. 12, a conventional PDCCH 1201 is allocated to a maximum of four symbols for each legacy subframe. In other words, the conventional PDCCH can be transmitted across the whole band through a maximum of #0 to #3 symbol of each subframe. FIG. 12 assumes that the PDCCH 1201 is allocated across the whole band through #0 and #1 symbol of each subframe.

In what follows, for the convenience of descriptions, it is assumed that the PDCCH 1201 is mapped to the first two symbols for each subframe.

In the frequency region except for a sub-band dedicated to low latency, a PDSCH 1202 for normal data transmission is allocated to the remaining symbols to which the PDCCH 1201 is not mapped. FIG. 12 illustrate a case where a PDSCH 1202 is allocated across the whole frequency region except for a sub-band dedicated to low latency through #3 to #13 symbol.

And for an arbitrary band, more than one sub-band (or sub-band group) for low latency can employ a short TTI frame structure.

In other words, in the case of a legacy subframe, more than one sub-band (or sub-band group) subdivides the symbols excluding those symbols to which the PDCCH 1201 has been mapped (namely, the whole symbols of the legacy subframe except for the symbol to which the PDCCH has been allocated) into n symbols of which the size corresponds to the size of a short TTI (for example, 2 to 4 symbol) and is composed of short TTI subframes sPDSCHs 1203. In this case, since only the sPDSCH is allocated to the short TTI subframe, the short TTI subframe and the sPDSCH can be interpreted in the same manner.

As shown in FIG. 12, in case the PDCCH 1201 is allocated to the aforementioned two symbols of a legacy subframe, four (=12/3) short subframes (sPDSCH) 1203 can be composed.

In this way, in case a subframe employs a short TTI frame structure, a short resource block (RB) can also be newly defined as a resource allocation unit for a low latency UE. For example, a short RB can be defined such that it consists of 12 sub-carriers in the frequency domain in the same way as in the prior art but consists of n symbols (namely, symbols having a short TTI size) in the time domain. Also, the short RB may consist of x sub-carriers (x<12), of which the total number is smaller than in the prior art, even in the frequency domain.

In the same manner as in the legacy PDSCH, mapping of data onto resource elements in the sPDSCH region can be first carried out in the increasing order of frequency index and then in the increasing order of symbol index.

The symbols (or the number of symbols) to which the PDCCH 1201 and sPDSCH 1203 are mapped; and the number of short TIs employed within one legacy subframe described earlier are only an example and the present invention is not limited to the example above.

In case a subframe comprises a short TTI frame structure as illustrated in FIG. 12, control information with respect to downlink data transmitted from a short TTI subframe (sPDSCH) 1203 (for example, frequency/time resource allocation information of the sPDSCH with respect to the downlink data, modulation and coding scheme (MCS), new data indicator (NDI), redundancy version (RV), transmit power control (TPC) command, and so on) can be transmitted through the PDCCH 1201.

As described above, in case the eNB transmits control information about downlink data transmitted from the sPDSCH 1203 through the PDCCH 1201, the PDCCH 1201 transmits control information related to the sPDSCH 1203 as well as the PDSCH 1202. Therefore, the UE needs to know from which of the PDSCH 1202 and the short TTI subframe (sPDSCH) 1203 downlink data are transmitted to the UE.

To this end, the downlink control information (DCI) format related to downlink data transmission can include a 'sPDSCH indicator field'.

Also, the DCI format related to downlink data transmission can include a 'TTI number field' indicating which short TTI subframe 1203 among 12/n short TTI subframes 1203 is scheduled to receive data.

In the following, detailed information about each field according to the present invention is provided.

1) sPDSCH Indicator (1 bit)

According to the present invention, the DCI related to downlink data transmitted from an sPDSCH includes an sPDSCH indicator (for example, 1 bit).

Also, the sPDSCH indicator (for example, 1 bit) may be added to the DCI format (in other words, the DCI format 1, 1A, 1B, 1C) for scheduling of downlink data of the existing PDCCH.

In case a particular band employs a sub-band specific 2-level frame structure according to the present invention, the UE has to perform decoding of data by using a short subframe structure in order to successfully receive data transmitted through an sPDSCH having a short TTI.

Therefore, for successful data reception, at the time of receiving a PDCCH, the UE needs to know whether the corresponding data are coming through the existing PDSCH or through an sPDSCH. To distinguish the two cases from each other, the DCI format transmitted through the PDCCH can include an one-bit sPDSCH indicator.

2) TTI Number (m Bit, for Example, 2 Bit in the Case of a 3 Symbol TTI)

In case one TTI comprises n symbols (for example, 3), the UE should be able to identify the region (namely, TTI/sPDSCH) to which its own downlink data are transmitted.

To this end, the DCI related to downlink data transmitted from an sPDSCH can include a TTI number field indicating to which TTI among 12/n (for example, 4) short TTIs the downlink data are transmitted.

Also, the DCI format for scheduling of downlink data of the existing PDCCH (namely, DCI format 1, 1A, 1B, 1C) may include the TTI number field.

The TTI number field can has a length of m bits (for example, in case n is 3, the length of the TTI number field meant for distinguishing 4 TTIs from each other is 2 bits). In this case, the TTI number field can be used to notify of the number of an sPDSCH within 1 ms (namely, legacy subframes).

In case a TTI comprises 3 symbols, 4 sPDSCHs can exist within 1 ms, and to identify the individual sPDSCHs, a TTI number field having a length of 2 bits can be included in a downlink grant (DL grant). In other words, the values of the corresponding fields are 0b00 for the 0-th sPDSCH, 0b01 for the 1st sPDSCH, 0b10 for the 2nd sPDSCH, and 0b11 for the 3rd sPDSCH.

Meanwhile, the sPDSCH indicator information and the TTI number information described above may be combined into one field.

In other words, the sPDSCH indicator and the TTI number field defined in the form of a bitmap may transmit all of the sPDSCH indicator information and the TTI number information.

For example, in case a TTI comprises 3 symbols, 4 sPDSCHs can exist within 1 ms, and to identify the individual sPDSCHs, an sPDSCH indicator having a length of 4 bits and a TI number field can be incorporated into a DL grant of the existing PDCCH. In other words, values of the corresponding fields are 1000 for the 0-th sPDSCH, 0100 for the 1st sPDSCH, 0010 for the 2nd sPDSCH, and 0001 for the 3rd sPDSCH. If the sPDSCH indicator and the TTI number field are set up by one of the values, the UE can know that downlink data are transmitted to the sPDSCH.

On the other hand, if the sPDSCH indicator and the TTI number field are all set to '0000', it indicates that downlink data for the corresponding UE are not transmitted through the sPDSCH but transmitted through the PDSCH.

FIG. 13 illustrates a radio frame structure according to one embodiment of the present invention.

With reference to FIG. 13, the PDCCH 1301 is allocated to the maximum of 4 aforementioned symbols for each subframe. In other words, the PDCCH can be transmitted across the whole band through a maximum of #0 to #3 symbols. FIG. 13 assumes the case where the PDCCH 1301 is composed across the whole band through #0 and #1 symbol of each subframe.

In what follows, for the convenience of descriptions, it is assumed that the PDCCH 1301 is mapped to the first two symbols for each subframe.

In the frequency region except for a sub-band dedicated to low latency, a PDSCH 1302 for normal data transmission can be allocated to the remaining symbols to which the PDCCH 1301 is not mapped. FIG. 13 illustrate a case where a PDSCH 1302 is allocated across the whole frequency region except for a sub-band dedicated to low latency through #3 to #13 symbol.

And more than one sub-band (or a sub-band group) for low latency can employ a short TTI frame structure. More specifically, in the case of a legacy subframe, more than one sub-band (or sub-band group) subdivides the symbols excluding those symbols to which the PDCCH 1301 has been mapped (namely, the whole symbols of the legacy subframe except for the symbol to which the PDCCH 1301 has been allocated) into n symbols of which the size corresponds to the size of a short TTI (for example, 2 to 4 symbol) and is composed of short TTI subframes (sPDSCHs 1303 and sPDSCHs 1304).

In other words, for each short TTI subframe, the sPDCCH 1303 is allocated to preceding, predetermined symbols (for example, one or two symbols), and the sPDSCH 1304 is allocated to the remaining symbols.

Although the number of symbols for the sPDCCH 1303 is not limited, it is preferred that the sPDCCH 1303 is composed of one symbol in case a short TTI subframe consists of three symbols.

As shown in FIG. 13, in case the PDCCH 1301 is allocated to the aforementioned two symbols of a legacy subframe, each subframe can comprise four (=12/3) short TTI subframes (sPDCCH 1301 and sPDSCH 1304). And for each short TTI subframe, the sPDCCH 1303 is allocated to the preceding one symbol, and the sPDSCH 1304 can be allocated to the remaining two symbols.

As described above, in case a subframe employs a short TTI frame structure, a short resource block (RB) can also be newly defined as a resource allocation unit for a low latency UE. For example, a short RB can be defined such that it consists of 12 sub-carriers in the frequency domain in the same way as in the prior art but consists of n symbols (namely, symbols having a short TTI size) in the time domain. Also, the short RB may consist of x sub-carriers (x<12), of which the total number is smaller than in the prior art, even in the frequency domain.

Also, in the same manner as in the legacy PDSCH, mapping of data onto resource elements in the sPDSCH region can be first carried out in the increasing order of frequency index and then in the increasing order of symbol index.

The symbols (or the number of symbols) to which the PDCCH 1301, sPDSCH 1303, and sPDSCH 1304 are mapped; and the number of short TTIs employed within one legacy subframe described earlier are only an example and the present invention is not limited to the example above.

As shown in FIG. 13, in case a subframe comprises short TTI subframes (sPDCCHs 1303 and sPDSCHs 1304), downlink control information (for example, frequency/time resource allocation information with respect to the downlink data of the sPDSCH; MCS, NDI, RV, TPC command; and so on) with respect to the downlink data transmitted from the sPDSCH 1304 can be transmitted through the sPDCCH 1303 newly defined within the short TTI subframe. In other words, the sPDCCH 1303 is transmitted across the whole band from a predetermined symbol within the short TTI subframe.

The PDCCH 1301 is transmitted to a set of one or more contiguous control channel elements (CCEs). A CCE consists of 9 resource element groups (REGs), and an REG consists of 4 resource elements.

However, in case the sPDCCH 1303 is configured as shown in FIG. 13, the format of the sPDCCH 1303 can be the same as that of the PDCCH 1301, which can be defined by a different format. For example, in the sPDCCH 1303 format, one CCE can consist of x (x<9) REGs, and the REG mapped to the sPDCCH 1303 region can consist of y (y<4) REs.

Meanwhile, the present invention can employ not only the new radio frame structure for low latency as described in FIGS. 12 and 13 but also a frame structure developed for a purpose different from the 1 ms subframe structure defined in the existing LTE/LTE-A standard (for example, transmission of data generated by an application requiring low latency) in the same band. In what follows, the frame structure according to the present invention will be described with reference to accompanying drawings.

FIG. 14 illustrates a radio frame structure according to one embodiment of the present invention.

With reference to FIG. 14, physical channels of the same frame structure can be designed for each sub-band (or sub-band group). In this case, a PDCCH can be formed for each sub-band (or sub-band group).

In other words, a PDCCH allocated to the corresponding sub-band (or sub-band group) transmits control information (for example, frequency/time resource allocation information with respect to the downlink data of the PDSCH or the sPDSCH; MCS, NDI, RV, TPC command; and so on) for a PDSCH allocated to the corresponding sub-band.

This scheme can be used for such a case where a radio frame structure of the existing LTE/LTE-A system is employed and data generated by a service suitable for low latency are transmitted through a particular sub-band.

For example, the sub-band (or sub-band group) #1 can be configured to transmit normal data, while the sub-band (or sub-band group) #2 is supposed to transmit data generated by an application requiring low latency.

At this time, a control channel allocated to the control region of a sub-band (or sub-band group) for transmitting data generated by an application requiring low latency may be called an sPDCCH, while a data channel allocated to the data region may be called a PDSCH.

As shown in FIG. 14, in case data intended for disparate purposes are transmitted for each sub-band (or sub-band group), the format of the PDCCH (or sPDCCH) transmitted from a sub-band (or sub-band group) to transmit data generated by an application requiring low latency can be the same as the format of the existing PDCCH, but may be defined by the one different from that of the existing PDCCH. For example, one CCE in the PDCCH (or sPDCCH) transmitted from a sub-band (or sub-band group) for transmitting data generated by an application requiring low latency can be composed of x REGs (x<9), or an REG can be composed of y REs (y<4).

Carrier/Cell-Wise 2-Level Frame Structure

The present invention can also be applied as a carrier/cell-wise 2-level frame structure rather than the subband-wise 2-level frame structure.

In other words, a carrier compliant with the existing LTE/LTE-A frame structure and a carrier compliant with a new radio frame structure can be allocated to a particular user.

This scheme can be used as another method for carrier aggregation. In this case, it is preferred that a PCell (Primary Cell) is configured to be compliant with the existing LTE/LTE-A frame structure, but a cell compliant with a new frame structure may be configured to operate as a PCell depending on a UE's characteristics. For a UE requiring low latency, by forcing two cells having frame structures different from each other to be aggregated, both of the two cells may be configured to operate as a PCell.

FIG. 15 illustrates a radio frame structure according to one embodiment of the present invention.

With reference to FIG. 15, the band (or carrier/cell) 1 is set up according to a legacy frame structure, the band (or carrier/cell) 2 is set up according to the short TTI frame structure of the present invention, and the band 1 and 2 are carrier-aggregated with respect to a particular UE.

In the band 1, a PDCCH 1501 and a PDSCH 1502 can be mapped according to the definition of the existing LTE/LTE-A system. In other words, the PDCCH 1501 is allocated to the maximum of 4 first symbols for each legacy subframe. In other words, the PDCCH can be transmitted across the whole band 1 through a maximum of #0 to #3 symbols. FIG. 15 assumes the case where the PDCCH 1501 is allocated across the whole band through #0 and #1 symbol of each subframe.

For those symbols to which the PDCCH 1501 is not mapped, the PDSCH 1502 used for transmission of normal data can be allocated across the whole band 1. FIG. 15 illustrates the case where the PDSCH 1502 is allocated across the whole band 1 for #3 to #13 symbols.

The band 2 having a short TTI frame structure can comprise more than one special symbol 1503 within one legacy subframe (namely, 1 ms) and more than one sPDSCH 1504 having the size of n symbols.

FIG. 15 illustrates the case where a special symbol 1503 having the size of one symbol and two sPDSCHs 1504 having the size of 3 symbols (n=3) are mapped; and a special symbol 1503 having the size of one symbol and two sPD-SCHs 1504 having the size of 3 symbols (n=3) are subsequently mapped within one legacy frame.

In other words, a short TTI radio frame structure comprises four short TTIs within one legacy subframe (namely, 1 ms), and one short TTI has a length of 3 symbols (namely, the length of an sPDSCH), which is about a length of 0.2 ms.

At this time, the special symbol 1503 can be composed of the symbols corresponding to the remainder (2=14% 3) of dividing the total number of symbols by the size of a short TTI (3 symbol in the case of FIG. 15). At this time, the order by which the special symbol 1503 and the sPDSCH 1504 are mapped onto the time axis can differ from the order as illustrated in FIG. 15.

As shown in FIG. 15, in case a band is composed of the special symbol 1503 and the sPDSCH 1504 only, the control information (for example, frequency/time resource allocation information with respect to the downlink data of the PDSCH or the sPDSCH; MCS, NDI, RV, TPC command; and so on) with respect to the downlink data transmitted from the sPDSCH 1504 can be transmitted through the PDCCH 1501 of another band (band 1 in the case of FIG. 15). In other words, cross carrier scheduling can be applied.

As described above, in case the eNB transmits control information with respect to the downlink data transmitted from the sPDSCH 1504 through the PDCCH 1501, the PDCCH 1501 transmits control information related to the sPDSCH 1504 of the band 2 as well as the PDSCH 1502 of the band 1. Therefore, the UE needs to know from which of the PDSCH 1502 and the sPDSCH 1504 the downlink data are transmitted to the UE.

To this end, as described in the example of FIG. 12, the downlink control information (DCI) format related to downlink data transmission can include a 'sPDSCH indicator field' and/or a 'TTI number field' indicating which sPDSCH 1504 among 12/n sPDSCHs 1504 is scheduled to receive data.

Also, the sPDSCH indicator information and the TTI number information may be combined into one field. In other words, the sPDSCH indicator and the TTI number field defined in the form of a bitmap may transmit all of the sPDSCH indicator information and the TTI number information.

As described above, in case a subframe employs a short TTI frame structure, a short resource block (RB) can also be newly defined as a resource allocation unit for a low latency UE. For example, a short RB can be defined such that it consists of 12 sub-carriers in the frequency domain in the same way as in the prior art but consists of n symbols (namely, symbols having a short TTI size) in the time domain. Also, the short RB may consist of x sub-carriers (x<12), of which the total number is smaller than in the prior art, even in the frequency domain.

Also, in the same manner as in the legacy PDSCH, mapping of data onto resource elements in the sPDSCH region can be first carried out in the increasing order of frequency index and then in the increasing order of symbol index.

Meanwhile, in the case of FIG. 15, the sPDCCH 1503 which transmits control information related to the sPDSCH 1504 may be allocated instead of the special symbol 1503.

In this case, in the band 2 which employs a short TTI frame structure, the sPDCCH 1503 can be mapped to more than one sPDSCH 1504. As shown in FIG. 15, the first and the second sPDSCH 1504 from the left of a legacy subframe are mapped to the first sPDCCH 1503, while the third and the fourth sPDSCH 1504 are mapped to the second sPDCCH 1503.

Therefore, control information (for example, frequency/time resource allocation information with respect to the downlink data of the sPDSCH; MCS, NDI, RV, TPC command; and so on) with respect to the downlink data transmitted from the sPDSCH 1504 can be transmitted through the sPDSCH 1504 and the sPDCCH being mapped 1503 (namely, the sPDCCH transmitted most recently before the corresponding sPDSCH). At this time, the sPDCCH 1503 is transmitted across the whole band.

Although the format of the sPDCCH 1503 employing a short TTI frame structure can be the same as that of the existing PDCCH 1501, it can be defined by a different format. For example, in the sPDCCH 1503 format, one CCE can consist of x (x<9) REGs, and the REG mapped to the sPDCCH 1503 region can consist of y (y<4) REs.

As described above, the band 1 employing a legacy frame structure or the band 2 employing a short TTI frame structure can operate as a PCell. Also, for a UE requiring low latency, by forcing the band 1 employing a legacy frame structure and the band 2 employing a short TTI frame structure to be aggregated, both of the band 1 and band 2 may be configured to operate as a PCell.

The symbols (or the number of symbols) to which the PDCCH 1501, sPDCCH 1503, and sPDSCH 1504 are mapped; and the number of short TTIs employed within one legacy subframe described earlier are only an example and the present invention is not limited to the example above.

However, it is preferred that the size n of a short TTI (the number of symbols) should be smaller than 7 to design a frame structure providing low latency.

FIG. 16 illustrates a radio frame structure according to one embodiment of the present invention.

With reference to FIG. 16, the band (or carrier/cell) 1 is set up according to a legacy frame structure, the band (or carrier/cell) 2 is set up according to the short TTI frame structure of the present invention, and the band 1 and 2 are carrier-aggregated with respect to a particular UE.

Since the band 1 is the same as the example of FIG. 15, descriptions related thereto will be omitted.

The band 2 having a short TTI frame structure can comprise more than one special symbol 1603 and more than one sPDSCH 1604 having the size of n symbols within one legacy subframe (namely, 1 ms).

FIG. 16 illustrates the case where a special symbol 1603 having the size of two symbols and four contiguous sPDSCHs 1504 each of which having the size of 3 symbols (n=3) are mapped within one legacy frame of the band 2.

In other words, a short TTI radio frame structure comprises four short TTIs within one legacy subframe (namely, 1 ms), and one short TTI has a length of 3 symbols (namely, the length of an sPDSCH), which is about a length of 0.2 ms.

At this time, the special symbol 1603 can be composed of the symbols corresponding to the remainder (2=14% 3) of dividing the total number of symbols by the size of a short TTI (3 symbol in the case of FIG. 16). At this time, the order by which the special symbol 1603 and the sPDSCH 1604 are mapped onto the time axis can differ from the order as illustrated in FIG. 16.

As shown in FIG. 16, in case a band is composed of the special symbol 1603 and the sPDSCH 1604 only, the control information (for example, frequency/time resource allocation information with respect to the downlink data of the sPDSCH; MCS, NDI, RV, TPC command; and so on) with respect to the downlink data transmitted from the sPDSCH 1604 can be transmitted through the PDCCH 1501 of another band (band 1 in the case of FIG. 16). In other words, cross carrier scheduling can be applied.

As described above, in case the eNB transmits control information with respect to the downlink data transmitted from the sPDSCH 1604 through the PDCCH 1601, the PDCCH 1601 transmits control information related to the sPDSCH 1604 of the band 2 as well as the PDSCH 1602 of the band 1. Therefore, the UE needs to know from which of the PDSCH 1602 and the sPDSCH 1604 the downlink data are transmitted to the UE.

To this end, as described in the example of FIG. 12, the downlink control information (DCI) format related to downlink data transmission can include a 'sPDSCH indicator field' and/or a 'TTI number field' indicating which sPDSCH 1604 among 12/n sPDSCHs 1604 is scheduled to receive data.

Also, the sPDSCH indicator information and the TTI number information may be combined into one field. In other words, the sPDSCH indicator and the TTI number field defined in the form of a bitmap may transmit all of the sPDSCH indicator information and the TTI number information.

As described above, in case a subframe employs a short TTI frame structure, a short resource block (RB) can also be newly defined as a resource allocation unit for a low latency UE. For example, a short RB can be defined such that it consists of 12 sub-carriers in the frequency domain in the same way as in the prior art but consists of n symbols (namely, symbols having a short TTI size) in the time domain. Also, the short RB may consist of x sub-carriers (x<12), of which the total number is smaller than in the prior art, even in the frequency domain.

Also, in the same manner as in the legacy PDSCH, mapping of data onto resource elements in the sPDSCH region can be first carried out in the increasing order of frequency index and then in the increasing order of symbol index.

Meanwhile, in the case of FIG. 16, the sPDCCH 1603 which transmits control information related to the sPDSCH 1604 may be allocated instead of the special symbol 1603.

In this case, in the band 2 which employs a short TTI frame structure, the sPDCCH 1603 can be mapped to more than one sPDSCH 1604. As shown in FIG. 16, the first and the second sPDSCH 1604 from the left of a legacy subframe are mapped to the first sPDCCH 1603, while the third and the fourth sPDSCH 1604 are mapped to the second sPDCCH 1603.

Therefore, control information (for example, frequency/time resource allocation information with respect to the downlink data of the sPDSCH; MCS, NDI, RV, TPC command; and so on) with respect to the downlink data transmitted from the sPDSCH 1604 can be transmitted through the corresponding sPDSCH 1604 and the sPDCCH being mapped 1603 (namely, the sPDCCH transmitted most recently before the corresponding sPDSCH). At this time, the sPDCCH 1603 is transmitted across the whole band.

Although the format of the sPDCCH 1603 employing a short TTI frame structure can be the same as that of the existing PDCCH 1601, it can be defined by a different format. For example, in the sPDCCH 1603 format, one CCE can consist of x (x<9) REGs, and the REG mapped to the sPDCCH 1603 region can consist of y (y<4) REs.

As described above, the band 1 employing a legacy frame structure or the band 2 employing a short TTI frame structure can operate as a PCell. Also, for a UE requiring low latency, by forcing the band 1 employing a legacy frame structure and the band 2 employing a short TTI frame structure to be aggregated, both of the band 1 and band 2 may be configured to operate as a PCell.

The symbols (or the number of symbols) to which the sPDCCH 1603 and sPDSCH 1604 are mapped; and the number of short TTIs employed within one legacy subframe described earlier are only an example and the present invention is not limited to the example above.

However, it is preferred that the size n of a short TTI (the number of symbols) should be smaller than 7 to design a frame structure providing low latency.

FIG. 17 illustrates a radio frame structure according to one embodiment of the present invention.

With reference to FIG. 17, the band (or carrier/cell) 1 is set up according to a legacy frame structure, the band (or carrier/cell) 2 is set up according to the short TTI frame structure of the present invention, and the band 1 and 2 are carrier-aggregated with respect to a particular UE.

Since the band 1 is the same as the example of FIG. 15, descriptions related thereto will be omitted.

The band 2 having a short TTI frame structure can comprise sPDCCHs 1703 and sPDSCHs 1704 in an alternate fashion within more than one legacy subframe (namely, 3 ms).

FIG. 17 illustrates the case where an sPDCCH 1703 having the size of one symbol and an sPDSCH 1704 having the size of 2 symbols (n=2) are mapped in an alternate fashion within three legacy frames of the band 2.

In other words, a short TTI radio frame structure comprises 14 short TTIs within three legacy subframes (namely, 3 ms), and one short TTI has a length of 3 symbols (namely, the length of an sPDCCH and an sPDSCH), which is about a length of 0.2 ms.

As described above, in case a subframe employs a short TTI frame structure, a short resource block (RB) can also be newly defined as a resource allocation unit for a low latency UE. For example, a short RB can be defined such that it consists of 12 sub-carriers in the frequency domain in the same way as in the prior art but consists of n symbols (namely, symbols having a short TTI size) in the time domain. Also, the short RB may consist of x sub-carriers (x<12), of which the total number is smaller than in the prior art, even in the frequency domain.

Also, in the same manner as in the legacy PDSCH, mapping of data onto resource elements in the sPDSCH region can be first carried out in the increasing order of frequency index and then in the increasing order of symbol index.

The control information (for example, frequency/time resource allocation information with respect to the downlink data of the sPDSCH; MCS, NDI, RV, TPC command; and so on) with respect to the downlink data transmitted from the sPDSCH 1704 can be transmitted through the corresponding sPDSCH 1704 and the sPDCCH being mapped 1703 (namely, the sPDCCH transmitted most recently before the corresponding sPDSCH). At this time, the sPDCCH 1703 is transmitted across the whole band.

Although the format of the sPDCCH 1703 employing a short TTI frame structure can be the same as that of the existing PDCCH 1701, it can be defied by a different format. For example, in the sPDCCH 1703 format, one CCE can consist of x (x<9) REGs, and the REG mapped to the sPDCCH 1703 region can consist of y (y<4) REs.

As described above, the band 1 employing a legacy frame structure or the band 2 employing a short TTI frame structure can operate as a PCell. Also, for a UE requiring low latency, by forcing the band 1 employing a legacy frame structure and the band 2 employing a short TTI frame structure to be aggregated, both of the band 1 and band 2 may be configured to operate as a PCell.

The symbols (or the number of symbols) to which the sPDCCH 1703 and sPDSCH 1704 are mapped; and the number of short TTIs employed within one legacy subframe described earlier are only an example and the present invention is not limited to the example above.

However, it is preferred that the size n of a short TTI (the number of symbols) should be smaller than 7 to design a frame structure providing low latency.

Sub-Band and Carrier/Cell-Wise 2-Level Frame Structure

Meanwhile, the sub-band and carrier/cell-wise 2-level frame structure described earlier can be applied together. This will be described with reference to the drawings below.

FIG. 18 illustrates a radio frame structure according to one embodiment of the present invention.

With reference to FIG. 18, the band (or carrier/cell) 1 is set up according to a legacy frame structure, the band (or carrier/cell) 2 is set up according to the sub-band wise short TTI frame structure of the present invention, and the band 1 and 2 are carrier-aggregated with respect to a particular UE.

Since the band 1 is the same as the example of FIG. 15, descriptions related thereto will be omitted.

The band 2 is subdivided into a plurality of sub-bands (or sub-band groups), and more than one sub-band (or sub-band groups) among them can be set up according to a short TTI frame structure.

More specifically, the PDCCH 1811 is allocated to a leading symbol for each subframe and is allocated to a maximum of four leading symbols. In other words, the PDCCH 1811 can be transmitted across the whole band through a maximum of #0 to #3 symbol of each subframe. FIG. 18 assumes that the PDCCH 1811 is allocated across the whole band through #0 and #1 symbol of each subframe.

In what follows, for the convenience of descriptions, it is assumed that the PDCCH 1811 is mapped to the first two symbols for each subframe.

In the frequency region except for a sub-band dedicated to low latency, a PDSCH 1812 for normal data transmission can be allocated to the remaining symbols to which the PDCCH 1811 is not mapped. FIG. 18 illustrate a case where a PDSCH 1812 is allocated across the whole frequency region except for a sub-band dedicated to low latency through #3 to #13 symbol.

And more than one sub-band (or a sub-band group) for low latency can employ a short TTI frame structure. More specifically, in the case of a legacy subframe, more than one sub-band (or sub-band group) subdivides the symbols excluding those symbols to which the PDCCH 1811 has been mapped (namely, the whole symbols of the legacy subframe except for the symbol to which the PDCCH 1811 has been allocated) into n symbols of which the size corresponds to the size of a short TTI (for example, 2 to 4 symbol) and is composed of short TTI subframes (sPDSCHs 1813 and sPDSCHs 1814).

In other words, for each short TTI subframe, the sPDCCH 1813 is allocated to preceding, predetermined symbols (for example, one or two symbols), and the sPDSCH 1814 is allocated to the remaining symbols.

Although the number of symbols for the sPDCCH 1813 is not limited, it is preferred that the sPDCCH 1813 is composed of one symbol in case a short TTI subframe consists of three symbols.

As shown in FIG. 18, in case the PDCCH 1811 is allocated to the preceding two symbols of a legacy subframe, each subframe can comprise four (=12/3) short TTI subframes (sPDCCH 1813 and sPDSCH 1814). And for each short TTI subframe, the sPDCCH 1813 is allocated to the preceding one symbol, and the sPDSCH 1814 can be allocated to the remaining two symbols.

In other words, a short TTI radio frame structure comprises four short TTIs within one legacy subframe (namely, 1 ms), and one short TTI represents a data channel having a length of 3 symbols, which is about a length of 0.2 ms.

As described above, in case a subframe employs a short TTI frame structure, a short resource block (RB) can also be newly defined as a resource allocation unit for a low latency UE. For example, a short RB can be defined such that it consists of 12 sub-carriers in the frequency domain in the same way as in the prior art but consists of n symbols (namely, symbols having a short TTI size) in the time domain. Also, the short RB may consist of x sub-carriers (x<12), of which the total number is smaller than in the prior art, even in the frequency domain.

Also, in the same manner as in the legacy PDSCH, mapping of data onto resource elements in the sPDSCH region can be first carried out in the increasing order of frequency index and then in the increasing order of symbol index.

As shown in FIG. 18, in case a few sub-bands of a particular band employ a short TTI frame structure, the control information (for example, frequency/time resource allocation information with respect to the downlink data of the sPDSCH; MCS, NDI, RV, TPC command; and so on) with respect to the downlink data transmitted from the sPDSCH 1814 can be transmitted through the corresponding sPDSCH 1814 and the sPDCCH being mapped 1813 (namely, the sPDCCH transmitted most recently before the corresponding sPDSCH). In other words, the control information with respect to the downlink data transmitted from the first leftmost sPDSCH 1814 is transmitted from the first sPDCCH 1813, and the control information with respect to the downlink data transmitted from the second sPDSCH 1814 is transmitted from the second sPDCCH 1813, and this scheme applies in the same way for the other cases.

Although the format of the sPDCCH 1813 employing a short TTI frame structure can be the same as that of the existing PDCCH 1811, it can be defined by a different format. For example, in the sPDCCH 1813 format, one CCE can consist of x (x<9) REGs, and the REG mapped to the sPDCCH 1813 region can consist of y (y<4) REs.

As described above, the band 1 employing a legacy frame structure or the band 2 of which a few sub-bands employing a short TTI frame structure can operate as a PCell. Also, for a UE requiring low latency, by forcing the band 1 employing a legacy frame structure and the band 2 of which a few sub-bands employing a short TTI frame structure to be aggregated, both of the band 1 and band 2 may be configured to operate as a PCell.

The symbols (or the number of symbols) to which the PDCCH 1811, sPDCCH 1813, and sPDSCH 1814 are mapped; and the number of short TTIs employed within one legacy subframe described earlier are only an example and the present invention is not limited to the example above.

Method for Transmitting Configuration Information about a Short TTI Frame Structure The radio resource information with respect to a short TTI frame structure according to the present invention can be transmitted through an RRC message intended for transmitting cell information.

FIG. 19 illustrates a method for transmitting information about a short TTI frame structure according to one embodiment of the present invention.

With reference to FIG. 19, the eNB transmits radio resource information with respect to a short TI frame structure (in what follows, 'short TTI radio resource information') to the UE through an RRC message S901.

At this time, an RRC message can correspond to a system information message, an RRC connection setup message, an RC connection reconfiguration message, or an RRC connection reestablishment message.

In what follows, specifics of short TTI radio resource information will be provided.

1) The short TI radio resource information can be transmitted to the UE through a cell-specific RRC message.

For example, the short TTI radio resource information can be transmitted being included in the 'RadioResourceConfigCommon' information element (IE) used for specifying radio resource configuration common to system information or mobility control information.

The 'RadioResouceConfigCommon' IE can be transmitted being included in a 'MobilityControlInfo' IE or a system information block type 2 (SIB-2) (or a newly defined SIB-x). The 'MobilityControlInfo' IE is an IE which includes a parameter related to a network controlled mobility controlled by a network within an E-UTRA.

The 'MobilityControlInfo' IE can be transmitted through an RRC connection reconfiguration message. The RRC connection reconfiguration message is a command message for modifying an RRC connection.

Also, the 'MobilityControlInfo' can be transmitted through the SIB-2 system information message. A system information message is used to transmit more than one system information block (SIB).

2) Since the short TTI radio resource information is used for a low latency UE, it may be transmitted to a low latency UE through a UE-specific RRC message.

For example, the short TTI radio resource information can be transmitted being included in a 'pdschConfigDedicated' IE or a 'physicalConfigDedicated' IE used to specify UE-specific physical channel configuration.

The 'pdschConfigDedicated' IE or the 'physicalConfigDedicated' IE can be transmitted being included in a 'RadioResourceConfigDedicated' IE. The 'RadioResourceConfigDedicated' IE is used to set up, modify, or release a radio bearer (RB), to modify MAC main configuration, to modify configuration of semi-persistent scheduling (SPS), and to modify dedicated physical configuration.

The 'RadioResourceConfigDedicated' IE can be transmitted being included in the RRC connection setup message, RRC connection reconfiguration message, or RRC connection reestablishment message.

The RRC connection setup message is used to establish a signaling radio bearer (SRB), and the RRC connection reestablishment message is used to re-establish the SRB.

In what follows, information included in the short TTI radio resource information will be described.

Frequency Resource Information for a Short TTI Subframe

This denotes frequency information about a sub-band to which a short TTI is applied within a frequency band. In case a sub-band and/or carrier-wise 2-level radio frame structure is used, the information can be included in short TTI radio resource information.

The frequency resource information for a short TTI subframe can be expressed in units of a sub-carrier or an RB. For example, the information can be expressed in terms of index information about a start and/or end resource (namely, a sub-carrier or an RB). Also, the information can be expressed by the index about a start or end resource (namely, a sub-carrier or an RB) and the number of resources (namely, a sub-carrier or an RB).

In the case of the sub-band wise 2-level frame structure (FIGS. 12 to 14, FIG. 18), the frequency resource information for a short TTI subframe represents frequency resource information about a particular sub-band employing a short TTI frame structure within a particular band.

On the other hand, in case a short TTI is applied across the whole of a particular band (FIGS. 15 to 17), the information can be expressed in terms of the highest/lowest resource (namely, a sub-carrier or an RB) index or set up by a predetermined value (for example, '0').

The Number of Symbols for a Short TTI Subframe

This number represents the number of symbols with respect to one short TTI subframe. For example, the short TTI subframe can be set to '3' consisting of three symbols.

In case a sub-band wise and/or carrier-wise 2-level radio frame structure is used, the number can be included in the short TTI radio resource information.

The Number of Symbols for an sPDCCH

This number represents the number of symbols about an sPDCCH within each short TTI subframe.

If an sPDCCH is present within a short TTI subframe (FIG. 13, FIGS. 17 and 18), the number can be included in the short TTI resource information.

The Number of Special Symbols

This number represents the number of special symbols found in a legacy subframe (namely, 1 ms). For example, the number can express two types of information such as '1' or '2'.

If a special symbol is found within a short TTI subframe (FIGS. 15 and 16), the number can be included in the short TTI radio resource information.

A UE requiring low latency can check radio resource information about a short TTI in the corresponding band by receiving short TTI radio resource information transmitted through an RRC message as illustrated previously in FIG. 19 and transmit and receive data by using a short TTI structure.

Meanwhile, the carrier/cell-wise 2-level frame structure described earlier can be set up for a UE employing carrier aggregation.

At this time, a low latency UE needs to configure a PCell and an SCell differently from legacy UEs, which will be described below with reference to related drawings.

FIG. 20 illustrates a method for configuring carrier aggregation for a carrier-wise 2-level frame structure according to one embodiment of the present invention.

With reference to FIG. 20, the eNB transmits radio resource information about a short TTI frame structure (in what follows, it is called 'short TTI radio resource information') to the UE through an RRC message S2001.

Since a method for transmitting and receiving short TTI radio resource information and information included therein are the same as in the descriptions of FIG. 19, descriptions thereof will be omitted.

The eNB transmits an RRC connection reconfiguration message to the UE to configure carrier aggregation S2002.

In case the UE carries out an attach process to a network through a carrier/cell employing a short TTI frame structure, the eNB can add a cell having a legacy frame structure to the UE as an SCell through the RRC connection reconfiguration message.

In other words, a carrier/cell having a legacy frame structure can be set up as an SCell.

The RRC connection reconfiguration message includes a 'radioResourceConfigDedicatedSCell' field.

The 'radioReourceConfigDedicatedSCell' field includes a 'SCellToAddMod' field. The 'SCellToAddMod' field is used for adding an SCell.

The 'SCellToAddMod' field includes a 'sCellIndex' field and a 'cellIdentification' field.

And the 'cellIdentification' field includes a 'physCellId' field and a 'dl-CarrierFreq' field.

The 'sCellIndex' field plays the role of a short identifier for identifying an SCell and can include the index of a carrier/cell employing a legacy frame structure.

The 'physCellId' field is used as a physical layer identifier of a cell and can include a physical layer identifier of a carrier/cell employing a legacy frame structure. And the 'dl-CarrierFreq' field specifies frequency information of a cell and can include frequency information of a carrier/cell employing a legacy frame structure.

FIG. 21 illustrates a method for configuring carrier aggregation for carrier-wise 2-level frame structure.

With reference to FIG. 21, the eNB transmits radio resource information about a short TTI frame structure (in what follows, it is called 'short TTI radio resource information') to the UE through an RRC message S2101.

Since the method for transmitting and receiving short TTI radio resource information and the information included therein are the same as in the descriptions of FIG. 19, descriptions thereof will be omitted.

The eNB transmits an RRC connection reconfiguration message to the UE to configure carrier aggregation S2102.

In case the UE carries out an attach process to a network through a carrier/cell employing a legacy frame structure, the eNB can add a cell having a short TTI frame structure to the UE as a secondary PCell (sPCell) through the RRC connection reconfiguration message. In other words, both of the carrier/cell having a legacy frame structure and the carrier/cell having a short TTI frame structure can be set up as a PCell.

In this way, in case two carriers/cells are set up as a PCell, it is preferable that control of each carrier/cell should be carried out depending on service characteristics. In other words, a carrier/cell having a short TTI frame structure can be made to carry out only the control dedicated for a service requiring low latency.

Having two PCells indicates that both of the two carriers/cells are monitored (namely, a pDCCH, an sPDCCH, or a paging interval is monitored) even if the UE enters an IDLE state or a dormant state. Therefore, any one of the two PCells may be defined as an SCell which provides the same meaning or carries out the same operation.

The RRC connection reconfiguration message includes a 'radioResourceConfigDedicatedSCell' field.

The 'radioResourceConfigDedicatedSCell' field includes a 'sPCellToAddMod' field. The 'sPCellToAddMod' field is used to add a secondary PCell.

The 'sPCIIToAddMod' field includes a 'sCellIndex' field and a 'cellIdentification' field.

And the 'cellIdentification' field includes a 'physCellId' field and a 'dl-CarrierFreq' field.

The sPCellIndex' field plays the role of a short identifier for identifying an SCell and can include the index of a carrier/cell employing a short TI frame structure.

The 'physCellId' field can include a physical layer identifier of a carrier/cell employing a short TTI frame structure, and the 'dl-CarrierFreq' field can include frequency information of a carrier/cell employing a short TTI frame structure.

Meanwhile, when adding an SCell or an SPCell to the UE as in FIGS. 20 and 21, the eNB can transmit information about a cell employing a short TTI radio frame structure to the UE.

In other words, the short TTI radio resource information described in the example of FIG. 19 can be transmitted to the UE at the S2002 step of FIG. 20 or at the S2102 step of FIG. 21. In this case, the S2001 step of FIG. 20 or the S2101 step of FIG. 21 can be skipped.

FIG. 22 illustrates a method for transmitting and receiving data according to one embodiment of the present invention.

With reference to FIG. 22, the eNB maps first downlink data to the PDSCH region employing a radio frame structure based on a first TTI S2201.

As described in FIGS. 12 to 18, the eNB maps normal downlink data not needing low latency to the PDSCH employing a legacy radio frame structure. At this time, the first TTI can correspond to the existing legacy TTI (namely, 1 ms).

The eNB maps second downlink data to the sPDSCH region employing a radio frame structure based on a second TTI S2202.

As described in FIGS. 12 to 18, the eNB maps downlink data requiring low latency to the PDSCH employing a short TTI radio frame structure according to the present invention. At this time, the second TTI can have the same number of symbols in the sPDSCH region or the same number of symbols in the sPDCCH and the sPDSCH region according to the present invention.

As described above, a subband-wise 2-level radio frame structure can be employed for one frequency band, but a carrier-wise 2-level radio frame structure may be employed for another frequency band.

In case a carrier-wise 2-level radio frame structure is employed for another frequency band, a cell employing a short TTI radio frame structure can be set up as a PCell. Also, both of a cell employing a legacy radio frame structure and a cell employing a short TTI radio frame structure may be set up as a PCell.

Both of the control information about first downlink data mapped to a PDSCH region and the control information about second downlink data mapped to an sPDSCH region can be transmitted to the PDSCCH employing a legacy radio frame structure.

Also, although the control information about first downlink data mapped to the PDSCH region are transmitted through a PDCCH employing a legacy radio frame structure, the control information about second downlink data mapped to the sPDSCH region can be transmitted through an sPDCCH employing a short TTI radio frame structure according to the present invention.

Since description about downlink control information transmitted through a PDCCH or an sPDCCH are the same as in the descriptions of FIGS. 12 to 18, descriptions thereof will be omitted.

Before transmitting the first downlink data and the second downlink data, the eNB can transmit short TTI radio resource information through a cell-specific RRC message or a UE-specific RRC message as illustrated in FIG. 19.

Meanwhile, although FIG. 22 assumed for the convenience of descriptions that the S2201 step precedes the S2202 step, the S2202 step can be carried out before the S2201 step.

Also, the S2201 and the S2202 step may be carried out simultaneously in the time domain.

FIG. 23 illustrates a method for transmitting downlink data according to one embodiment of the present invention.

With reference to FIG. 23, the UE receives first downlink data in a PDSCH region employing a radio frame structure based on a first TTI S2301.

By blind-decoding the PDSCCH region, the UE obtains downlink control information transmitted to the UE. And based on the obtained downlink control information, the UE decodes downlink data transmitted to the UE in the PDSCH region.

The UE receives second downlink data in an sPDSCH region employing a radio frame structure based on a second TTI S2302.

By blind-decoding the PDSCCH region or the sPDCCH region, the UE obtains downlink control information transmitted to the UE. And based on the obtained downlink control information, the UE decodes downlink data transmitted to the UE in the sPDSCH region.

FIG. 23 illustrates a method for receiving downlink data through a subband-wise 2-level radio frame structure in a UE-specific manner or through a carrier-wise 2-level radio frame structure for different frequency bands.

The UE can receive short TTI radio resource information as illustrated in FIG. 19 from the eNB before carrying out the S2301 and the S2302 step. Also, when the eNB configures carrier aggregation at the S2002 step of FIG. 20 or at the S2102 step of FIG. 21 (namely, when an SCell or an sPCell is added), the UE can receive short TTI radio resource information from the eNB.

Meanwhile, the present invention can be applied in the same way for an uplink band.

For example, according to the present invention, one legacy subframe incorporates 12/n (in the case of a normal CP) short subframes (an integer value, 4 short subframes in case n=3) and 12$n special symbols (two special symbols in case n=3) through an TTI comprising n symbols (for example, three symbols). At this time, the 14% n special symbols can be designed so that they can be used as contention-based resources capable of transmitting uplink data through contention among UEs without uplink resource allocation from the eNB.

The 2-level frame structure according to the present invention can transmit and receive low latency data by using a new frame structure which minimizes an effect on legacy UEs.

More specifically, a legacy UE operating in a frequency band according to the present invention blind-decodes a PDCCH across the whole frequency band of each subframe to receive data. And in case there is control information being transmitted to the legacy UE, it receives the corresponding data based on the information received through the PDCCH.

Since the eNB does not use a sub-band allocated for low latency operation for data scheduling of a legacy UE, it does not require the legacy UE to carry out some new operation. Moreover, in case no data are transmitted to a sub-band dedicated to low latency operation in the corresponding 1 ms subframe, the eNB can use the same resource allocation method as used for data transmission of a legacy UE for allocation of sub-band resources for low latency operation. Since the eNB controls PDSCH resource allocation with respect to a PDSCH, the present invention provides an advantageous effect that a legacy method can still be employed for legacy UEs.

At this time, a 5G UE requiring low latency can receive data much faster by using a short TTI as it receive data in the sPDSCH resource region. However, although a data reception delay may incur a somewhat different effect according to a PDCCH mapping method with respect to an sPDSCH in the various embodiments above, data can be received always with a shorter delay than the delay at the time of data transmission employing the existing 1 ms subframe structure.

FIG. 24 illustrates a delay in radio transmission and reception employing a short TTI radio frame structure according to one embodiment of the present invention.

FIG. 24 illustrates a radio transmission and reception delay in view of implementation of downlink transmission and reception when 1 TTI is set up to comprise three symbols (namely, 0.213 ms).

With reference to FIG. 24, a propagation delay is generated between the time the eNB starts transmission of downlink data and the time the UE starts receiving the downlink data. And as the UE buffers the downlink data before decoding the downlink data, a buffering delay is generated. A delay due to buffering in the UE can amount to a total of about 0.071 ms. A processing delay due to downlink data (and control information) decoding in the UE can amount to less than about 0.525 ms.

In this way, one-way over-to-air (OTA) latency from the eNB to the UE can amount to less than about 0.6 ms.

And a delay due to preparation for ACK/NACK (for example, ACK/NACK encoding) and a propagation delay (PD) generated at the time of the ACK/NACK consumes a total of less than about 0.3 ms for the UE.

In this way, for one-way data transmission, a transmitter-side (for example, the eNB) may need about 1 ms of roundtrip OTA latency to receive the ACK/NACK from a receiver side (for example, the UE).

After all, by using a short TTI frame structure of the present invention, the roundtrip OTA latency can be reduced by an amount of about 3 ms compared with the example of FIG. 11.

Apparatus for Implementing the Present Invention

FIG. 25 is a block diagram of a wireless communication apparatus according to an embodiment of the present invention.

Referring to FIG. 25, a wireless communication system includes an eNB 2510 and a plurality of UEs 2520 belonging to the eNB 2510.

The eNB 2510 includes a processor 2511, a memory 2512, a radio frequency (RF) unit 2513. The processor 2511 may be configured to implement the functions, procedures and/or methods proposed by the present invention as described in FIGS. 1-24. Layers of a wireless interface protocol may be implemented by the processor 2511. The memory 2512 is connected to the processor 2511 and stores various types of information for operating the processor 2511. The RF unit 2513 is connected to the processor 2511, transmits and/or receives an RF signal.

The UE 2520 includes a processor 2521, a memory 2522, and an RF unit 2523. The processor 2521 may be configured to implement the functions, procedures and/or methods proposed by the present invention as described in FIGS. 1-24. Layers of a wireless interface protocol may be implemented by the processor 2521. The memory 2522 is connected to the processor 2511 and stores information related to operations of the processor 2522. The RF unit 2523 is connected to the processor 2511, transmits and/or receives an RF signal.

The memories 2512 and 2522 may be located inside or outside the processors 2511 and 2521 and may be connected to the processors 2511 and 2521 through various well-known means. The eNB 2510 and/or UE 2520 may include a single antenna or multiple antennas.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

Although the method for transmitting and receiving data in the wireless communication system of the present invention is described mainly for the example applied to 3GPP LTE/LTE-A system, it is also possible to be applied to various wireless communication system as well as 3GPP LTE/LTE-A system.

What is claimed is:

1. A method for receiving downlink data in a wireless communication system, the method being performed by a terminal comprising:

receiving, from a base station, first downlink control information for scheduling a short physical downlink shared channel (sPDSCH);

receiving, from the base station, second downlink control information for scheduling a physical downlink shared channel (PDSCH);

receiving, from the base station, first downlink data on the sPDSCH based on the first downlink control information, based on a first transmission time interval (TTI)-based radio frame structure; and receiving, from the base station, second downlink data on the PDSCH based on the second downlink control information, based on a second TTI-based radio frame structure, wherein the first TTI-based radio frame structure is shorter in time than the second TTI-based radio frame structure, wherein the first TTI-based radio frame structure includes only the sPDSCH, wherein the second TTI-based radio frame structure includes a physical downlink control channel (PDCCH) and the PDSCH, and based on that the first TTI-based radio frame structure includes only the sPDSCH:

the first downlink control information and the second downlink control information are mapped to the PDCCH, and the PDSCH and the sPDSCH are scheduled based on the PDCCH.

2. The method of claim 1, wherein, based on that the first TTI-based radio frame structure includes only the sPDSCH:

the first downlink control information includes a first identifier for identifying whether the first downlink data is transmitted on the sPDSCH.

3. The method of claim 1,
wherein a downlink frequency band to which the first downlink data is mapped and a downlink frequency band to which the second downlink data is mapped are same, and
wherein the downlink frequency band includes at least one subband.

4. The method of claim 3,
wherein one or more subband included in the at least one subband is configured in the first TTI-based radio frame structure for a transmission of the first downlink data.

5. The method according to claim 4,
wherein a remaining subband except for the one or more subbands in the at least one subband is configured with the second TTI-based radio frame structure for a transmission of the second downlink data.

6. The method of claim 5,
wherein the one or more subbands are configured with the second TTI based radio frame structure when the transmission of the first downlink data is completed, and
wherein the second downlink data on the PDSCH is included in the one or more subbands.

7. The method of claim 1, further comprising:
receiving, from the base station, location information indicating a starting position of the sPDSCH within a first downlink frequency band when the first downlink frequency band to which the first downlink data is mapped and a second downlink frequency band to which the second downlink data is mapped are different,
wherein the first downlink frequency band and the second downlink frequency band are aggregated.

8. The method of claim 7,
wherein the first downlink frequency band includes at least one subband, and
wherein the at least one subband includes the second TTI based radio frame structure.

9. The method according of claim 1,
wherein the first downlink data is data requiring low-latency, and
wherein the second downlink data is data that does not require low delay.

10. The method of claim 1,
wherein a number of resource elements included in a resource element group (REG) related to a short physical downlink control channel (sPDCCH) is smaller than a number of resource elements included in a REG related to the PDCCH.

11. The method of claim 1,
wherein a number of subcarriers included in a first resource block (RB) consisting of the sPDSCH is smaller than a number of subcarriers included in a second RB consisting of the PDSCH.

12. The method of claim 1, wherein a length of the first TTI-based radio frame structure in a time domain is equal to a length of 3 OFDM (orthogonal frequency-division multiplexing) symbols.

13. The method of claim 1, wherein a number of resource element groups (REGs) consisting of a CCE (control channel element) related to a short physical downlink control channel (sPDCCH) is smaller than a number of resource element groups (REGs) consisting of a CCE related to the PDCCH.

14. A method for transmitting downlink data in a wireless communication system, the method being performed by a base station comprising:
transmitting, to a terminal, first downlink control information through a physical downlink control channel (PDCCH) or a short PDCCH (sPDCCH);
transmitting, to the terminal, second downlink control information for scheduling a physical downlink shared channel (PDSCH);
transmitting, to the terminal, first downlink data on the sPDSCH based on the first downlink control information, based on a first transmission time interval (TTI)-based radio frame structure; and
transmitting, to the terminal, second downlink data on the PDSCH based on the second downlink control information, based on a second TTI-based radio frame structure,
wherein the first TTI-based radio frame structure is shorter in time than the second TTI-based radio frame structure,
wherein the first TTI-based radio frame structure includes only the sPDSCH,
wherein the second TTI-based radio frame structure includes a physical downlink control channel (PDCCH) and the PDSCH, and
based on that the first TTI-based radio frame structure includes only the sPDSCH:
the first downlink control information and the second downlink control information are mapped to the PDCCH, and
the PDSCH and the sPDSCH are scheduled based on the PDCCH.

15. A terminal for receiving downlink data in a wireless communication system, the terminal comprising:
an RF (Radio Frequency) unit for transmitting and receiving a radio signal; and
a processor functionally coupled to the RF unit,
wherein the processor is configured to:
receive, from a base station, first downlink control information for scheduling a short physical downlink shared channel (sPDSCH);
receive, from the base station, second downlink control information for scheduling a physical downlink shared channel (PDSCH);
receive, from the base station, first downlink data on the sPDSCH based on the first downlink control information, based on a first transmission time interval (TTI)-based radio frame structure; and
receive, from the base station, second downlink data on the PDSCH based on the second downlink control information, based on a second TTI-based radio frame structure,
wherein the first TTI-based radio frame structure is shorter in time than the second TTI-based radio frame structure,
wherein the first TTI-based radio frame structure includes only the sPDSCH,
wherein the second TTI-based radio frame structure includes a physical downlink control channel (PDCCH) and the PDSCH, and
based on that the first TTI-based radio frame structure includes only the sPDSCH:
the first downlink control information and the second downlink control information are mapped to the PDCCH, and the PDSCH and the sPDSCH are scheduled based on the PDCCH.

* * * * *